(12) United States Patent
Meeks et al.

(10) Patent No.: US 12,146,830 B2
(45) Date of Patent: *Nov. 19, 2024

(54) SLOPE, P-COMPONENT AND S-COMPONENT MEASUREMENT

(71) Applicant: Lumina Instruments Inc., San Jose, CA (US)

(72) Inventors: Steven W. Meeks, Palo Alto, CA (US); Hung Phi Nguyen, Santa Clara, CA (US); Alireza Shahdoost Moghaddam, San Jose, CA (US)

(73) Assignee: Lumina Instruments Inc., San Jose, CA (US)

( * ) Notice: Subject to any disclaimer, the term of this patent is extended or adjusted under 35 U.S.C. 154(b) by 414 days.

This patent is subject to a terminal disclaimer.

(21) Appl. No.: 17/685,719

(22) Filed: Mar. 3, 2022

(65) Prior Publication Data

US 2022/0187204 A1    Jun. 16, 2022

Related U.S. Application Data

(63) Continuation-in-part of application No. 17/576,986, filed on Jan. 16, 2022, now Pat. No. 11,988,615, which is a continuation-in-part of application No. 16/838,026, filed on Apr. 2, 2020, now Pat. No. 11,255,796, which is a continuation-in-part of (Continued)

(51) Int. Cl.
    *G01N 21/47*    (2006.01)
    *G01B 11/24*    (2006.01)

(52) U.S. Cl.
    CPC ............ *G01N 21/47* (2013.01); *G01B 11/24* (2013.01); *G01N 2201/021* (2013.01); *G01N 2201/0633* (2013.01)

(58) Field of Classification Search
    CPC ...... G01N 21/958; G01N 21/21; G01N 21/55; G01N 2201/06113; G01N 2201/0633; G01N 2201/0636; G01N 21/896; G01N 2021/8967; G01N 21/8422; G02B 26/0816; G02B 26/101; G02B 26/105; G02B 27/54
    See application file for complete search history.

(56) References Cited

U.S. PATENT DOCUMENTS

| 3,879,131 A * | 4/1975 | Cuthbert | G01N 21/956 250/559.44 |
| 5,760,951 A * | 6/1998 | Dixon | G02B 21/002 359/368 |

(Continued)

*Primary Examiner* — Dominic J Bologna
(74) *Attorney, Agent, or Firm* — Imperium Patent Works LLP; Mark D. Marrello

(57) ABSTRACT

An optical scanning system including a radiating source capable of outputting a source light beam, a de-scan lens that is configured to output a de-scanned light beam, the de-scanned light beam is created by focusing light reflected from the sample and the de-scan lens is located approximately one focal length of the de-scan lens from an irradiation location where the light beam irradiates the sample, a focusing lens that is configured to output a focused light beam, a collimating lens that is configured to output a collimated light beam, a polarizing beam splitter that is configured to be irradiated by the collimated light beam, and a detector that is configured to be irradiated by at least a portion of the collimated light beam that is not reflected by the polarizing beam splitter.

21 Claims, 30 Drawing Sheets

ANGLE INDEPENDENT SURFACE HEIGHT OPTICAL INSPECTOR

Related U.S. Application Data application No. 16/289,632, filed on Feb. 28, 2019, now Pat. No. 10,641,713.

(56) References Cited

U.S. PATENT DOCUMENTS

| | | | | |
|---|---|---|---|---|
| 6,134,002 | A * | 10/2000 | Stimson | G01J 3/2803 |
| | | | | 359/368 |
| 10,767,977 | B1 * | 9/2020 | Meeks | G01N 21/958 |
| 11,255,796 | B2 * | 2/2022 | Meeks | G02B 27/283 |
| 11,733,173 | B1 * | 8/2023 | Meeks | G01B 11/24 |
| | | | | 356/237.2 |
| 11,852,592 | B2 * | 12/2023 | Meeks | G01N 21/8422 |
| 2002/0015146 | A1 * | 2/2002 | Meeks | G01B 11/065 |
| | | | | 356/73 |
| 2006/0055938 | A1 * | 3/2006 | Podoleanu | G01B 9/0201 |
| | | | | 356/497 |
| 2014/0218724 | A1 * | 8/2014 | Meeks | G01N 21/9505 |
| | | | | 356/237.4 |
| 2019/0179127 | A1 * | 6/2019 | Mertz | G02B 27/0977 |
| 2022/0136982 | A1 * | 5/2022 | Meeks | G02B 26/105 |
| | | | | 356/369 |
| 2022/0187057 | A1 * | 6/2022 | Meeks | G01N 21/8422 |
| 2022/0187204 | A1 * | 6/2022 | Meeks | G02B 5/003 |
| 2022/0269071 | A1 * | 8/2022 | Meeks | G02B 26/0816 |

* cited by examiner

GLASS WITH THIN FILM LAYER
(CROSS-SECTIONAL VIEW)

RETARDANCE VS INCIDENT ANGLE

FIG. 3 PHASE RETARDANCE OPTICAL INSPECTOR

INTENSITY DIFFERENCE: INDICATES SURFACE SLOPE.
INTENSITY SUM: INDICATES TOTAL REFLECTIVITY.

BI-CELL DETECTOR

BEAM REFLECTOR OUT-OF-PHASE OPERATION

COMBINED BEAM REFLECTOR RETARDANCE COMPARISON

RETARDANCE VS FIELD OF VIEW

| INPUT TIME VARYING BEAM REFLECTOR | OUTPUT TIME VARYING BEAM REFLECTOR |
|---|---|
| 19° | 4° |
| 18° | 5° |
| 17° | 6° |
| 16° | 7° |
| 15° | 8° |
| 14° | 9° |
| 13° | 10° |
| 12° | 11° |
| 11° | 12° |
| 10° | 13° |
| 9° | 14° |
| 8° | 15° |
| 7° | 16° |
| 6° | 17° |
| 5° | 18° |
| 4° | 19° |

*INPUT ANGLES ABOUT THE AXIS PERPENDICULAR TO THE INCIDENT ANGLE OF THE SCANNING BEAM

*OUTPUT ANGLES ABOUT THE AXIS PERPENDICULAR TO THE ANGLE OF THE REFLECTED SCANNING BEAM

OUT-OF-PHASE OPERATION OF
TIME VARYING BEAM REFLECTORS

FIG. 8

BEAM RETARDANCE MAPPING

SCATTERED RADIATION OPTICAL INSPECTOR

SCATTERED RADIATION MAPPING

PHASE RETARDANCE
DEFECT DETECTION FLOWCHART

SCATTERED RADIATION
DEFECT DETECTION FLOWCHART

FIG. 14 REGION PROBING OPTICAL INSPECTOR

REFLECTED LIGHT MEASUREMENT MAP
FOR REGION PROBING

FOCAL PLANE ILLUMINATION WITH REGION FILTERING

SELECTED REGION OF THE SAMPLE AT LOCATION (X2, Y1)

REGION PROBING

| MEASURED REFLECTED INTENSITY | DEFECT PRESENT IN PROBED REGION? |
|---|---|
| GREATER THAN THRESHOLD | DEFECT PRESENT |
| LESS THAN OR EQUAL TO THRESHOLD | NO DEFECT PRESENT |

EXAMPLE THRESHOLDS FOR DEFECT LOCATION DETERMINATION

DEFECT DETECTION USING REGION PROBING

DEFECT DEPTH DETECTION USING SCATTERED RADIATION

DEFECT DEPTH DETECTION USING SCATTERED RADIATION

DEFECT DEPTH DETECTION USING SCATTERED RADIATION

| SEPARATION BETWEEN SCATTER EVENTS (X) | DEFECT LOCATION |
|---|---|
| > 686 MICRONS | BOTTOM SURFACE PARTICLE |
| 646 TO 686 MICRONS | TOP SURFACE PARTICLE |
| 20 TO 645 MICRONS | INCLUSION (NON-SURFACE PARTICLE) |
| < 20 MICRONS | BOTTOM SURFACE PARTICLE |

*EXAMPLE FOR 500 MICRON THICK SAMPLE WITH ∅=56.3° AND N=1.5

EXAMPLE THRESHOLDS FOR DEFECT LOCATION DETERMINATION

FIG. 23

SCATTERED RADIATION
DEFECT DEPTH DETECTION FLOWCHART

DEFECT DETECTION FLOWCHART

FIG. 26 PHASE RETARDANCE OPTICAL INSPECTOR

PHASE RETARDANCE
DEFECT DETECTION FLOWCHART

SCATTERED RADIATION
DEFECT DETECTION FLOWCHART

SIMPLIFIED EXAMPLE OF ANGLE INDEPENDENT
SURFACE HEIGHT OPTICAL INSPECTOR AT DIFFERENT SAMPLE HEIGHTS

SIMPLIFIED EXAMPLE OF AN ANGLE INDEPENDENT SURFACE HEIGHT OPTICAL INSPECTOR AT DIFFERENT SAMPLE ANGLES

ANGLE INDEPENDENT SURFACE HEIGHT OPTICAL INSPECTOR

SLOPE, P-COMPONENT AND S-COMPONENT MEASUREMENT

CROSS REFERENCE TO RELATED APPLICATIONS

This application is a continuation-in-part of, and claims priority under 35 U.S.C. § 120 from nonprovisional U.S. patent application Ser. No. 17/576,986, entitled "REGION PROBER OPTICAL INSPECTOR," filed on Jan. 16, 2022, the subject matter of which is incorporated herein by reference. In turn, nonprovisional U.S. patent application Ser. No. 17/576,986 is a continuation-in-part of, and claims priority under 35 U.S.C. § 120 from nonprovisional U.S. patent application Ser. No. 16/838,026, entitled "REGION PROBER OPTICAL INSPECTOR," filed on Apr. 2, 2020, the subject matter of which is incorporated herein by reference. In turn, nonprovisional U.S. patent application Ser. No. 16/838,026 is a continuation-in-part of, and claims priority under 35 U.S.C. § 120 from nonprovisional U.S. patent application Ser. No. 16/289,632, entitled "PHASE RETARDANCE OPTICAL SCANNER," filed on Feb. 28, 2019, the subject matter of which is incorporated herein by reference The present invention generally relates to systems and methods for detecting characteristics in materials. More specifically, the present invention relates to detecting characteristics in materials by way of measuring light reflected from the materials. This invention was made with government support under 2126628 awarded by the National Science Foundation. The government has certain rights in the invention.

TECHNICAL FIELD

Background Information

Many thin films are used in high technology products. For example, thin films on glass are used in many high technology products such as televisions, monitors, and mobile devices. Inspecting glass is challenging due to its low reflectivity and high transparency. Previous techniques perform glass inspection that requires the glass sample to be spun. Spinning a glass sample introduces problems for glass samples that are fragile, not symmetric, or large. Regardless of these problems, glass samples that are fragile, not symmetric, or large need to be tested for defects before used in costly manufacturing processes and integrated into expensive high technology products.

SUMMARY

In a first novel aspect, an optical scanning system includes a radiating source capable of outputting a light beam, a first time varying beam reflector that is configured to reflect the light beam through a scan lens towards a transparent sample at an incident angle that is not more than one degree greater or less than Brewster's angle of the transparent sample, and a second time varying beam reflector that is configured to reflect the light beam reflected from the transparent sample after passing through a de-scan lens onto a phase retardance detector. The output of the phase retardance detector is usable to determine if a defect is present on the transparent sample. The first time varying beam reflector causes a first phase retardance of the light beam and the second time varying beam reflector causes a second phase retardance of the reflected light beam in the opposite direction of the first phase retardance.

In one example, the optical scanning system further includes a memory circuit and a processor circuit adapted to read information received from the phase retardance detector, and determine if a defect is present on the transparent sample.

In a second novel aspect, an optical scanning system includes a radiating source capable of outputting a light beam, a time varying beam reflector that is configured to reflect the light beam through a scan lens towards a transparent sample at an incident angle that is not more than one degree greater or less than Brewster's angle of the transparent sample, and a focusing lens configured to be irradiated by light scattered from the transparent sample at an angle that is normal to the plane of incidence of the moving irradiated spot on the transparent sample. A first portion of the light beam is scattered from a first surface of the transparent sample and a second portion of the light beam is scattered from a second surface of the transparent sample. A spatial filter is configured to block the second portion of the light beam scattered from the second surface of the transparent sample.

In one example, the optical scanning system further includes a memory circuit and a processor circuit adapted to read information received from the detector and determine if a defect is present on the first surface of the transparent sample.

In a third novel aspect, the angle of incidence of the incident beam is within ten (10) degrees of Brewster's angle.

In a fourth novel aspect, an angle independent optical surface inspector capable of generating a light beam, directing the light beam to a sample, and de-scanning a reflected light beam that is reflected from the sample, thereby generating a first de-scanned light beam. The de-scanning is performed at approximately one focal length of a de-scanning lens from an irradiation location where the light beam irradiates the sample. The optical inspector also capable of focusing the first de-scanned light beam, thereby generating a focused light beam, and measuring the location of the focused light beam. The measuring of the location is performed at approximately one focal length of a focusing lens from the focusing lens. The incident angle of the light beam is within ten degrees of Brewster's angle. The focusing is performed by an achromatic lens.

In a fifth novel aspect, an optical scanning system includes a radiating source capable of outputting a source light beam, a de-scan lens that is configured to output a de-scanned light beam, the de-scan lens is located approximately one focal length of the de-scan lens from a sample irradiation location, a focusing lens that is configured to output a focused light beam, a first non-polarizing beam splitter configured to be irradiated by at least a portion of the focused light beam, a second non-polarizing beam splitter configured to be irradiated by at least a portion of the focused light beam that is reflected by the first non-polarizing beam splitter, and a detector that is located at approximately one focal length of the focusing lens from the focusing lens, the detector is configured to be irradiated by at least a portion of the focused light beam that is reflected by the second non-polarizing beam splitter.

In a sixth novel aspect, an optical scanning system includes a radiating source capable of outputting a source light beam, a de-scan lens that is configured to output a de-scanned light beam, the de-scan lens is located approximately one focal length of the de-scan lens from an sample irradiation location, a focusing lens that is configured to output a focused light beam, a first non-polarizing beam splitter configured to be irradiated by at least a portion of the focused light beam, a second non-polarizing beam splitter configured to be irradiated by at least a portion of the focused light beam that is reflected by the first non-polarizing beam splitter, and a detector that is located at approximately one focal length of the focusing lens from the focusing lens, the detector is configured to be irradiated by at least a portion of the focused light beam that is not reflected by the second non-polarizing beam splitter.

In a seventh novel aspect, an optical scanning system including a radiating source capable of outputting a source light beam, a de-scan lens that is configured to output a de-scanned light beam, the de-scanned light beam is created by focusing light reflected from the sample and the de-scan lens is located approximately one focal length of the de-scan lens from an irradiation location where the light beam irradiates the sample, a focusing lens that is configured to output a focused light beam, a collimating lens that is configured to output a collimated light beam, a polarizing beam splitter that is configured to be irradiated by the collimated light beam, and a detector that is configured to be irradiated by at least a portion of the collimated light beam that is not reflected by the polarizing beam splitter.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 8 is a table listing an example of the angles of rotation for both the input mirror and the output mirror when operated in an out-of-phase manner.

FIG. 23 is an example of separation ranges between scattered radiation events for an exemplary transparent sample.

DETAILED DESCRIPTION

Reference will now be made in detail to background examples and some embodiments of the invention, examples of which are illustrated in the accompanying drawings. In the description and claims below, relational terms such as "top", "down", "upper", "lower", "top", "bottom", "left" and "right" may be used to describe relative orientations between different parts of a structure being described, and it is to be understood that the overall structure being described can actually be oriented in any way in three-dimensional space.

Many high technology products involve depositing films on glass or other transparent substrates. An important process control metric is to measure the film thickness and film defects on the glass substrate. This has proven to be difficult due to the low reflectivity of glass and the difficulty of separating signals from the top surface of the glass substrate from signals from the bottom surface of the glass substrate. Another issue with measuring the film thickness and film defects on the glass substrate is that the current techniques do not allow for scanning of many different shapes and sizes of transparent samples.

A solution is needed that: (i) accurately separates signals from the top surface of the glass substrate from signals from the bottom surface of the glass substrate, (ii) detects the presence of defects in response to small changes in signals from the surface of the glass substrate, and (iii) allows for scanning of many different shapes and sizes of transparent samples.

The present invention provides a solution to this problem by providing a scanning method that irradiates the transparent sample at, or near, the Brewster's angle of the transparent sample. This scanning method of irradiating the transparent sample at, or near, Brewster's angle also provides a scan in the x-y coordinate system, which makes the present invention capable of scanning any object shape or object size that is substantially flat.

Figure 1:
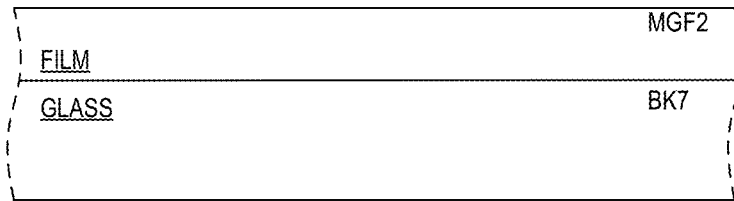
FIG. 1 is a cross-sectional diagram of a thin film deposited on top of a glass sample.

Transparent sample surfaces, such as glass, frequently have thin films deposited upon their surfaces. FIG. 1 is a cross-sectional diagram of a thin film deposited on top of a glass sample. It is desirable to be able to inspect the transparent sample surface both before deposition for surface cleanliness and after the deposition to check and for film defects. In order to achieve this goal, it is necessary that the technique be very sensitive to films on the transparent sample surface. It is also necessary that that the technique be able to separate the received signal from the top surface of the transparent sample from the received signal from the bottom surface of the transparent sample.

Figure 2:
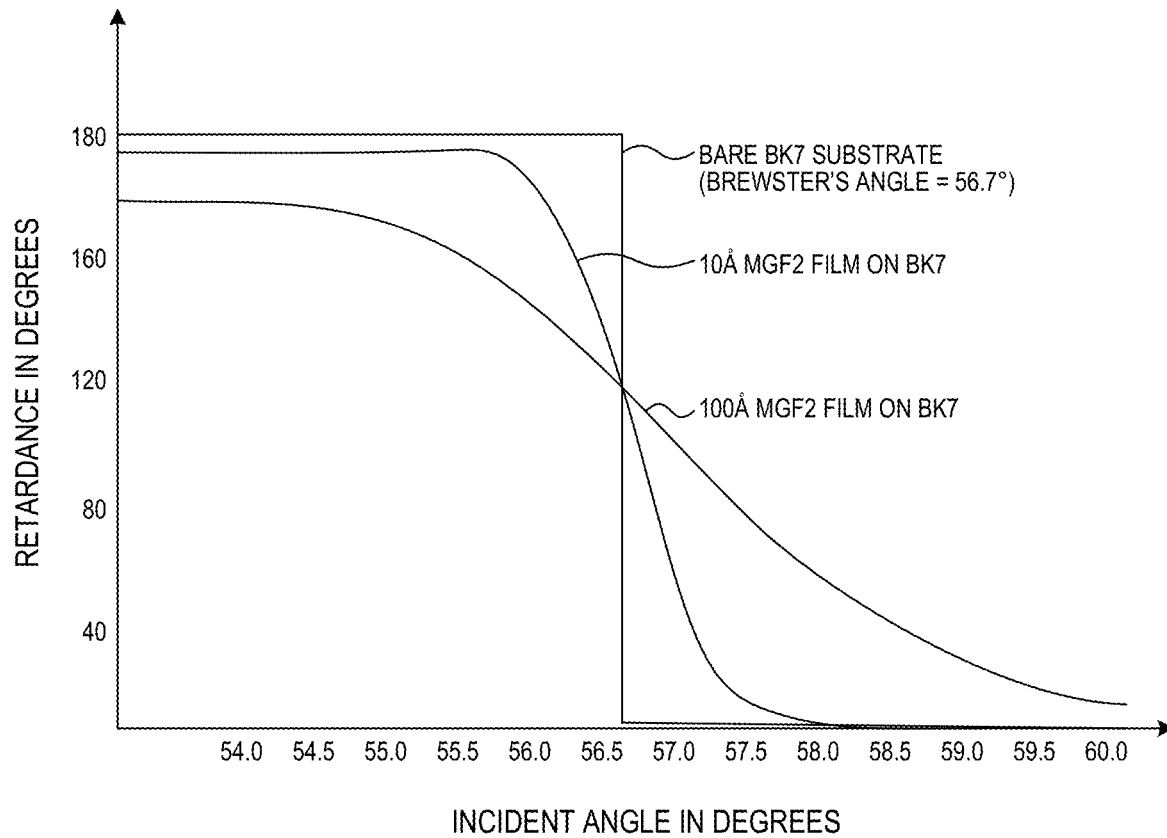
FIG. 2 is a graph illustrating the relationship between phase retardance and the incident angle of irradiating light for a bare glass sample, a 10 Å thin film deposited on a glass sample, and a 100 Å thin film deposited on a glass sample.

The sensitivity to films on a transparent sample can be addressed by considering the information illustrated in FIG. 2. FIG. 2 is a graph illustrating the relationship between phase retardance and the incident angle of irradiating light for a bare glass sample, a 10 Å thin film deposited on a glass sample, and a 100 Å thin film deposited on a glass sample. More specifically, FIG. 2 shows the retardance ($\Phi_P - \Phi_S + \pi$) versus the angle of incidence for a typical transparent sample, such as glass (BK7) with a $MgF_2$ film layer thickness as a parameter. On a glass substrate, the retardance reduces to just the phase of the P wave ($\Phi_P$). One conclusion to draw from FIG. 2 is that to detect films on transparent samples, such as glass, it is desirable to operate with a polarization that is near P polarization (polarization that is parallel to the plane of incidence). Another conclusion to draw from FIG. 2 is that it is desirable to perform the scan by irradiating the transparent sample at an incident angle that is at, or near, the Brewster's angle of the transparent sample. For example, ten times more (10×) sensitivity can be achieved by operating at 57 degrees instead of at 60 degrees. Sensitivity is defined as the difference between the 10 Angstrom film curve and the bare glass curve. There is, however, a tradeoff given that operation at exactly Brewster's angle in P polarization will result in no signal being reflected from the transparent solid. Therefore, it is desirable to perform the scan by irradiating the sample at an angle of incidence that is no more than one degree greater or less than Brewster's angle for the transparent sample. It is also desirable to perform the scan by irradiating the sample with a polarization that is no more than 20 degrees from P polarization.

Figure 3:
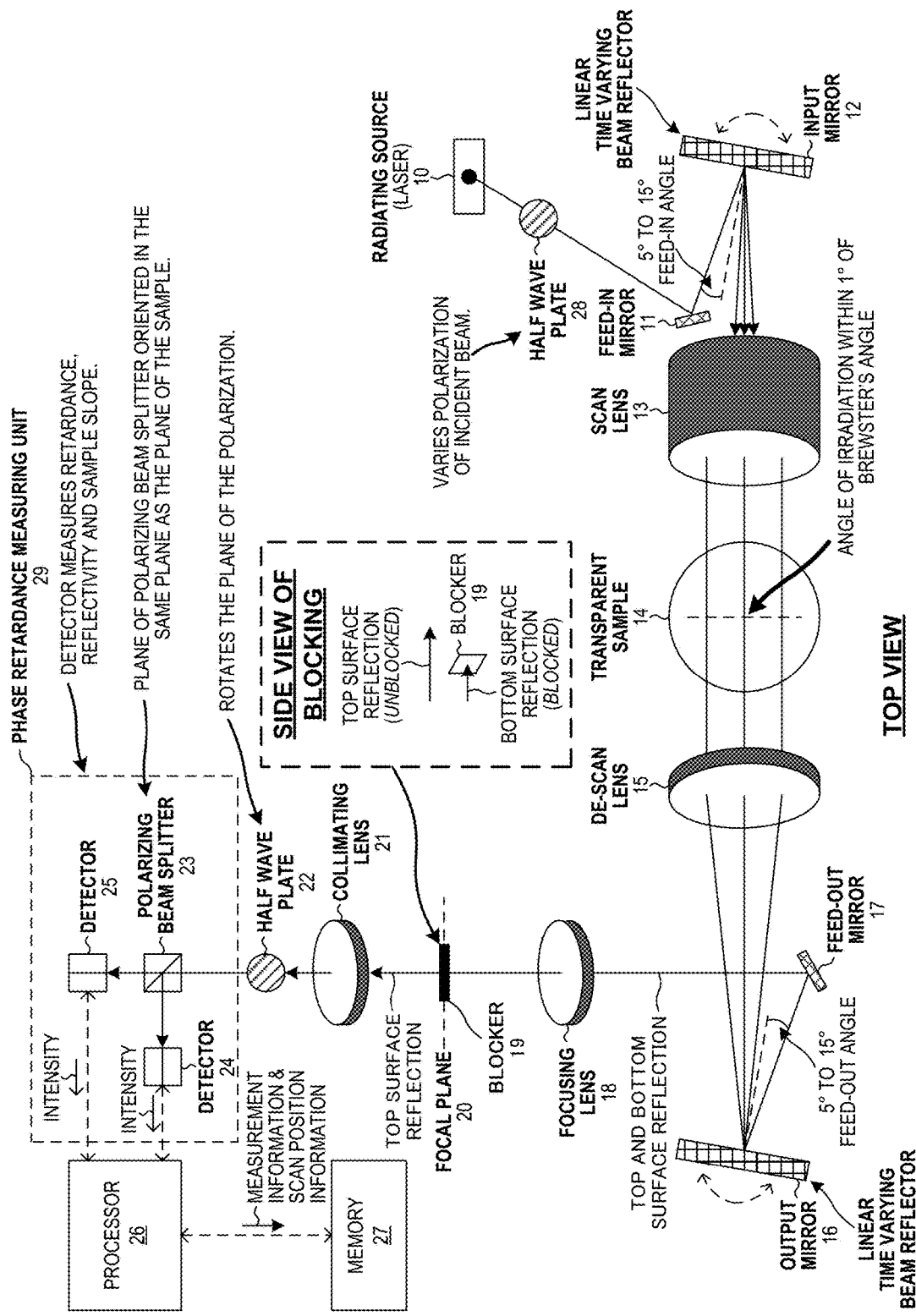
FIG. 3 is a diagram of a phase retardance optical inspector.

FIG. 3 is a diagram of a phase retardance optical inspector. The phase retardance optical inspector includes a radiating source 10, a half-wave plate 28, a feed-in mirror 11, an input mirror (input time varying beam reflector) 12, a scan lens 13, a de-scan lens 15, an output mirror (output time varying beam reflector) 16, a feed-out mirror 17, a focusing lens 18, a blocker 19 located at a focal plan 20 of the focusing lens 18, a collimating lens 21, a half-wave plate 22, a phase retardance measuring unit 29, a processor 26 (optional), and a memory 27 (optional). The phase retardance measuring unit includes a polarizing beam splitter 23, a first detector 24 and a second detector 25.

In one example, the input 12 and output 16 mirrors are linear time varying beam reflectors, which vary the angle of reflection linearly as they are rotated. Input 12 and output 16 mirrors may also be controlled by an electrical signal, such as a signal generator. Input 12 and output 16 mirrors may be referred to as galvanometer mirrors.

Figure 4:
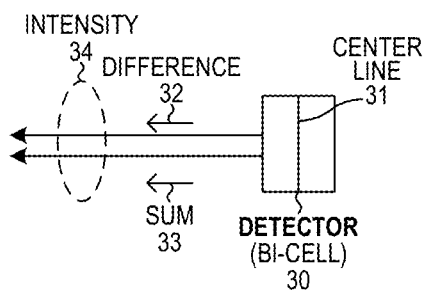
FIG. 4 is a diagram of a bi-cell detector.

In one example, the first and/or second detectors are bi-cell detectors. An example of a bi-cell detector is illustrated in FIG. 4. A bi-cell detector has a center line 31 that separates a first photo sensor from a second photo sensor. The bi-cell detector can be configured so that it outputs a first signal that indicates the difference between the light intensity measured by one side of the detector and the light intensity measured by another side of the detector. The bi-cell detector also can be configured so that it outputs a second signal that indicates the summation of the light intensity measured by one side of the detector and the light intensity measured by another side of the detector.

In operation, the phase retardance optical inspector measures retardance by measuring the change in polarization of the signal from the transparent sample that results from irradiation of the transparent sample by a scanning beam as it travels across a transparent sample. In order to accurately measure the change in polarization due to the signals from the transparent solid, and not due to the phase retardance caused by the inspector itself, it is required that the optics that produce the moving beam and the optics that de-scan and guide the signals from the transparent solid produce minimal polarization change (retardance).

Figure 5:
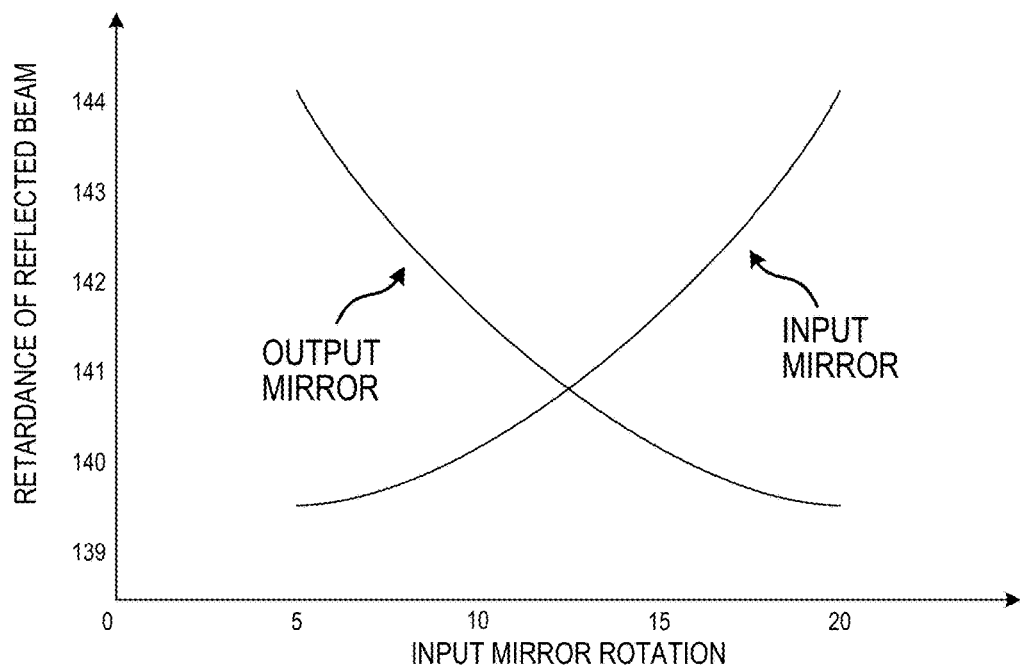
FIG. 5 is a graph illustrating phase retardance caused by both the input mirror and the output mirror when the mirrors are operating in an out-of-phase manner. More specifically, the graph illustrates the relationship between the phase of a beam reflecting off the input and output mirror versus the rotation angle of the input mirror.

A major source of polarization change (retardance) caused by the phase retardance optical inspector is the input 12 and output 16 mirrors. The polarization change (retardance) caused by input mirror 12 and output mirror 16 is illustrated in FIG. 5. Input mirror 12 and output mirror 16 can be operated in any desired manner based on their electric control signals, however, the manner in which the input 12 and output 16 mirrors are operated has a large impact on the polarization change (retardance) introduced by the phase retardance optical inspector. The polarization change (retardance) produced by each mirror is a function of the angle of incidence of the light upon the mirror. The larger the angle of incidence, the larger the polarization change (retardance).

Figure 6:
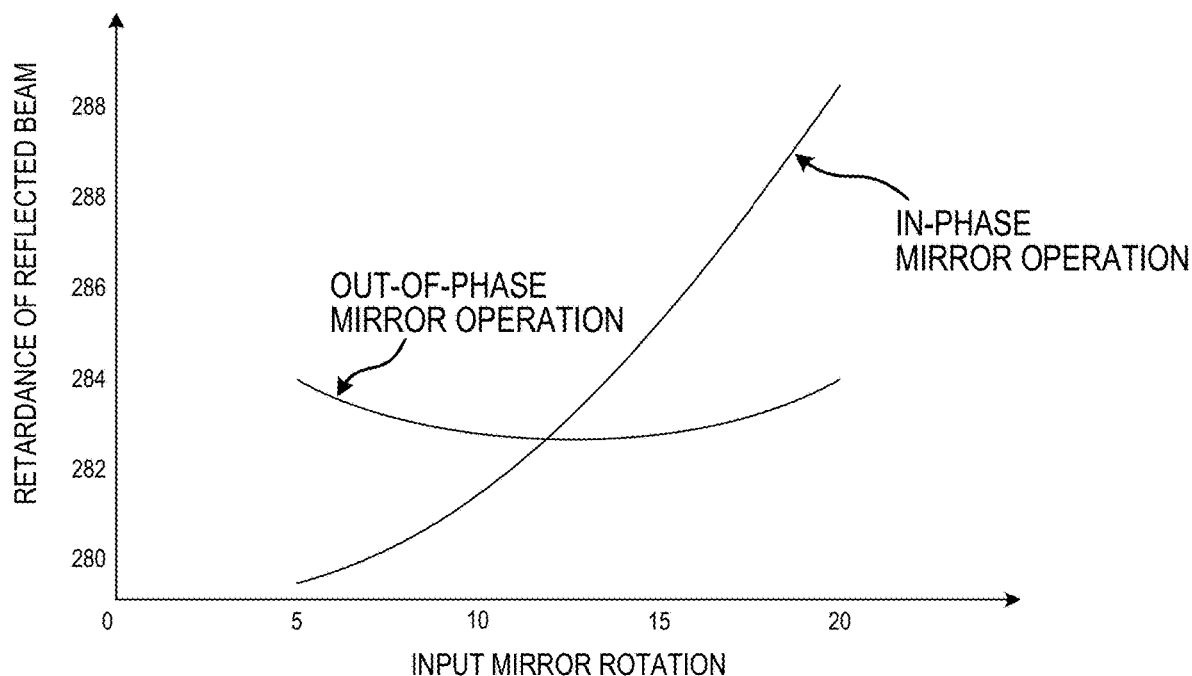
FIG. 6 is a graph illustrating the combined phase retardance for both in-phase mirror operation and out-of-phase mirror operation. More specifically, the graph illustrates the relationship between the resulting phase of the beam after being reflected by both the input and output mirrors versus the rotation angle of the input mirror.

In one example, the input mirror 12 and the output mirror 16 could be operated such that the both mirrors operate in-phase, such that each mirror is rotated so that each mirror has the same angle with respect to the beam. This "In-Phase" operation of the input 12 and output 16 mirrors causes maximum polarization change (retardance) because as the input mirror 12 rotates to increase its angle with respect to the beam the amount of polarization change caused by the input mirror increases, and as the output mirror 16 rotates to increase its angle with respect to the beam the amount of polarization change caused by the output mirror increases. Therefore, the polarization change (retardance) caused by each mirror is always in the same direction and results in a maximum polarization change. This maximum variation of phase change (retardance) during "In-Phase" operation is illustrated in FIG. 6. FIG. 6 clearly shows that as the angle of mirror rotation increases, so does the polarization change (retardance).

In another example, the input mirror 12 and the output mirror 16 could be operated such that the mirrors operate out-of-phase, such that each mirror is rotated so that each mirror has the opposite angle with respect to the beam. FIG. 8 is a table listing an example of the angles of rotation for both the input mirror and the output mirror when operated in an out-of-phase manner. This "Out-of-Phase" operation of the input 12 and output 16 mirrors causes minimum polarization change (retardance) because as the input mirror 12 rotates to increase its angle with respect to the beam the amount of polarization change caused by the input mirror increases, and as the output mirror 16 rotates to decrease its angle with respect to the beam the amount of polarization change caused by the output mirror decreases. Therefore, the polarization change (retardance) caused by each mirror is always in the opposite direction and resulting in a minimum. This minimum variation of phase change (retardance) during "Out-of-Phase" operation is also illustrated in FIG. 6. FIG. 6 clearly shows that as the angle of mirror rotation increases, polarization change (retardance) does not exceed two degrees.

With respect to the Out-of-Phase operation, it is also noted that not only is the polarization change (retardance) across the field of view reduced by this technique, but also the reflectivity variation caused by each mirror is reduced as well. This is because the reflectivity of the input mirror is decreasing as its angle of incidence increases and the output mirror reflectivity is increasing since its angle of incidence is decreasing. These two effects will nearly cancel one another resulting in a very minimal change in reflectivity versus angle of incidence.

Another major source of polarization change (retardance) caused by the phase retardance optical inspector is the feed-in angle of the scanning beam upon the input mirror 12. As discussed above, the polarization change (retardance) is reduced as the angle of incidence approaches zero degrees. However, from a practical point of view, feed-in angles of approximately five degrees are possible. In the phase retardance optical inspector the feed-in angle is controlled by the configuration of the radiating source 10 and feed-in mirror 11. In one example, the radiating source 10 and feed-in mirror 11 are configured so that the resulting feed-in angle to input mirror 12 is twelve degrees. A fixed feed-in angle of twelve degrees causes a minimal polarization change (retardance) by the input mirror 12.

In one example, the light reflected by the feed-in mirror irradiates the input mirror 12 at an angle that is not greater than thirty degrees from the normal angle of the input mirror 12 (first time varying beam reflector) when the input mirror 12 is positioned at a mid-point of the input mirror 12 rotational range.

Similarly, yet another major source of polarization change (retardance) caused by the phase retardance optical inspector is the feed-out angle of the signal from the transparent sample upon the output mirror 16. As discussed above, the polarization change (retardance) is reduced as the angle of incidence approaches zero degrees. However, from a practical point of view, feed-out angles of approximately five to fifteen degrees are possible. In the phase retardance optical inspector the feed-out angle is controlled by the configuration of the de-scanning lens 15, output mirror 16, and feed-out mirror 17. In one example, the de-scanning lens 15, output mirror 16, and feed-out mirror 17 are configured so that the resulting feed-out angle to output mirror 17 is twelve degrees. A fixed feed-out angle of twelve degrees causes a minimal polarization change (retardance) by the feed-out mirror 17.

Figure 7:
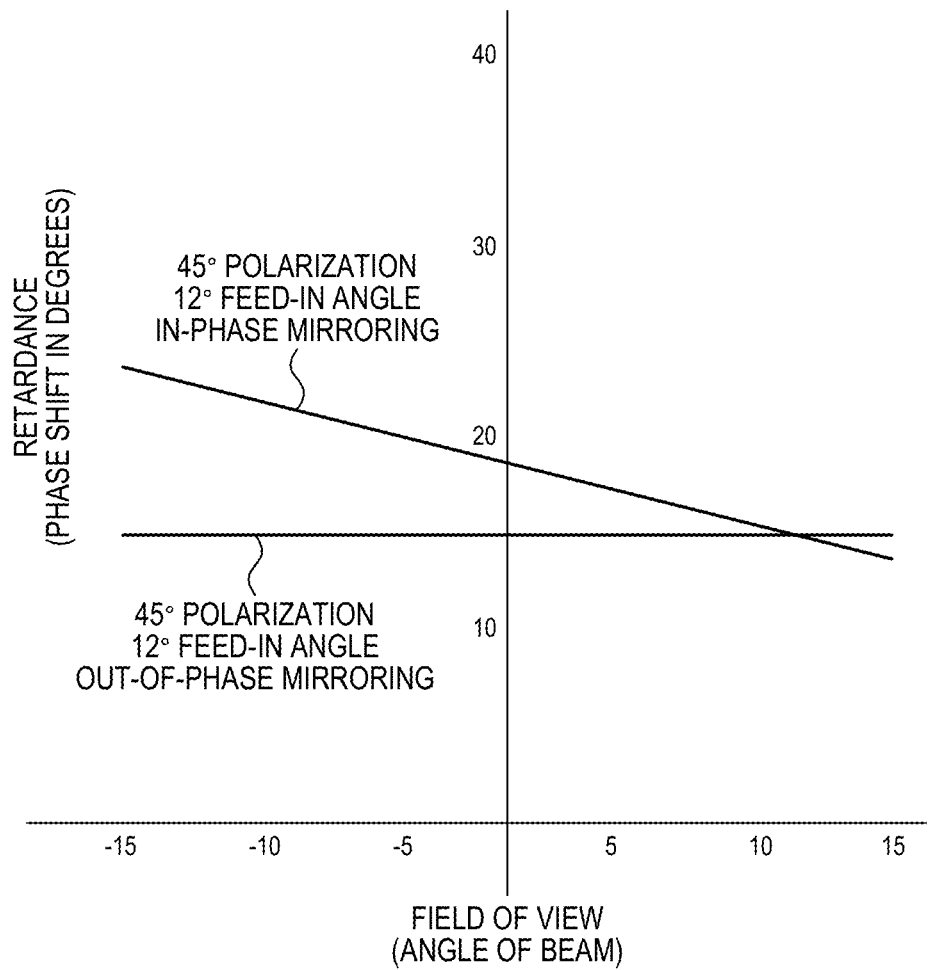
FIG. 7 is a graph illustrating the relationship between total phase retardance of the phase retardance optical inspector versus the field of view of the phase retardance optical inspector at the location of the phase retardance detector.

The combination of the Out-of-Phase operation of the input 12 and output 16 mirrors with the minimal feed-in and feed-out angles result in an optical inspector that produces minimal polarization change (retardance). An example of the resulting polarization change (retardance) at the phase retardance measuring unit 29 versus field of view of the optical inspector is illustrated in FIG. 7. This clearly shows the advantage of out-of-phase mirroring versus in-phase mirroring.

The half-wave plate 28 can be used to adjust the polarization of the scanning beam output by the radiating source 10. In one example, the half-wave plate 28 is used to adjust the polarization of the scanning beam to be as close as possible to P polarized. As discussed above, it is advantageous to scan a transparent sample with a near P polarized scan beam.

The scan lens 13 operates to focus the scanning beam onto the transparent sample. In one example, the scan lens 13 is a telecentric scan lens. Scan lens 13 is configurable such that the scanning beam output from the scan lens 13 irradiates the transparent sample at an angle that is not more than one degree from Brewster's angle of the transparent sample. Another type of lens which may replace the scan lens is an achromat.

In one example, the transparent sample is glass. In another example, the transparent sample is a thin film deposited on a transparent material. Other examples of transparent samples include but are not limited to: sapphire, fused silica, quartz, silicon carbide, and polycarbonate.

De-scan lens 15 operates to focus the signal from the transparent sample onto output mirror 16. In one example, the de-scan lens 15 is an achromat. An achromat can be used for de-scanning because critical focusing and telecentricity is not needed when receiving the signal from the transparent sample. This is an economical benefit because an achromat is much less expensive than a telecentric lens. Other examples of a de-scan lens include, but are not limited to: spherical singlet, spherical doublets, triplet, or aspheric lens.

Feed-out mirror 17 operates to reflect the signal from the output mirror 16 to focusing lens 18. Focusing lens 18 has a focal plane 20. At the focus of the focusing lens 18 there will be two spots (provided the sample is transparent) and these spots correspond to signal from the top and bottom surfaces of the sample. In one example, focusing lens 18 is an achromatic lens. Other examples of a focusing lens include but are not limited to: spherical singlet, spherical doublets, triplet, or aspheric lens.

In one example, the light reflected by output mirror 16 irradiates the feed-out mirror at an angle that is not greater than thirty degrees from the normal angle of output mirror 16 (the second time varying beam reflector) when output mirror 16 is positioned at a mid-point of output mirror 16 rotational range.

Blocker 19 is located near the focal plane 20 and operates to block a portion of the signal from the transparent sample that is from a specific surface of the transparent sample. For example, as illustrated in FIG. 3, blocker 19 may be configured so to block signal from the bottom surface of the transparent sample, while allowing the signal from the top surface of the transparent sample to pass. Although not illustrated, the blocker 19 can also be configured so to block signal from the top surface of the transparent sample, while allowing the signal from the bottom surface of the transparent sample to pass. In this fashion, the phase retardance optical inspector is able to differentiate signal from the top of the transparent sample from signal from the bottom of the transparent sample. In one example, the blocker 19 is a mirror. Other examples of a blocker include but are not limited to: an absorbing material, a blackened piece of aluminum, and a black painted piece of metal.

Collimating lens 21 operates to collimate the signal from the transparent sample that is not blocked by blocker 19. In one example, the collimating lens 21 is an achromatic lens. Other examples of a collimating lens include but are not limited to: spherical singlet, spherical doublets, triplet, or aspheric lens.

Half-wave plate 22 operates to adjust the polarization of the signal from the transparent sample before irradiating polarizing beam splitter 23 of the phase retardance measuring unit 29. In one example, the half-wave plate 22 adjusts the polarization of the signal from the transparent sample so that the signals incident upon detectors 24 and 25 are approximately equal.

Upon being irradiated, polarizing beam splitter 23 allows all light polarized in one direction to pass through to detector 25 and reflects all light polarized in the other direction to detector 24. The plane of the polarizing beam splitter 23 is the same as the plane of the sample. Detector 24 outputs a signal indicating the intensity of the light that irradiated detector 24. Detector 25 outputs a signal indicating the intensity of the light that irradiated detector 25. The difference between the signals from the two detectors is proportional to the polarization change (retardance) of the scanning beam caused by defects of the transparent sample or films on the transparent sample. Any small change in the film thickness or properties can be detected by comparing the output signals of detectors 24, 25. The sum of the signals from the two detectors is proportional to the reflectivity of the transparent sample or films on the transparent sample.

In the case where the detectors are bi-cell detectors, the phase retardance measuring unit can also determine a change in the surface slope of the transparent sample.

Processor 26 (optional) can be used to read the output signals from detectors 24 and 25. Processor 26 can execute code that calculates the difference between the output signals and determine if a defect is present on the transparent sample as well as what type of defect the defect is. The processor 26 may also store the intensity values indicated by the output signals in a memory 27 (optional). The processor 26 may also read instructions from memory 27. The processor 26 may also read one or more threshold values to aid in the determination if a defect is present and the type of defect when a defect is present.

Figure 9:
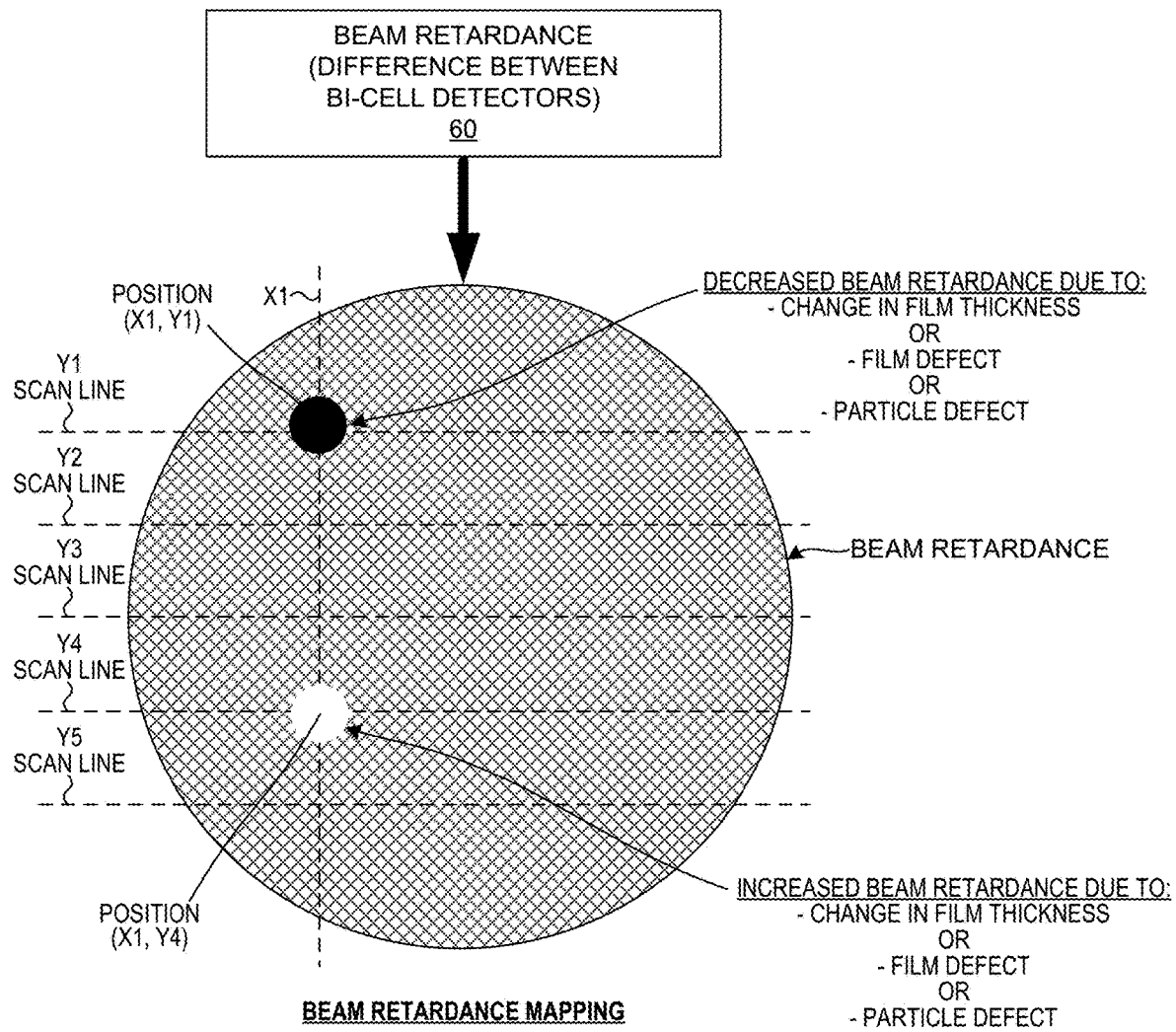
FIG. 9 is a diagram of a beam retardance mapping illustrating the detection of defects by way of detecting changes in the beam retardance.

FIG. 9 is a diagram of a beam retardance mapping illustrating the detection of defects by way of detecting changes in the beam retardance. This mapping can be created manually based on monitoring the output of the phase retardance measuring unit 29. Alternatively, this mapping can be created automatically by a processor that samples the output of the phase retardance measuring unit 29 and stores the resulting difference computations in memory 27. The beam retardance mapping can then be used to determine if a defect is present on the transparent sample or the thin film deposited on the transparent sample. For example, a decrease in the beam retardance can indicate a change in film thickness, a film defect or a particle defect on the transparent sample. Alternatively, an increase in the beam retardance can indicate a change film thickness, a film defect, or a particle defect on the transparent sample. This beam retardance mapping can also be output as a digital file that is sharable with consumers of the transparent sample.

Figure 10:
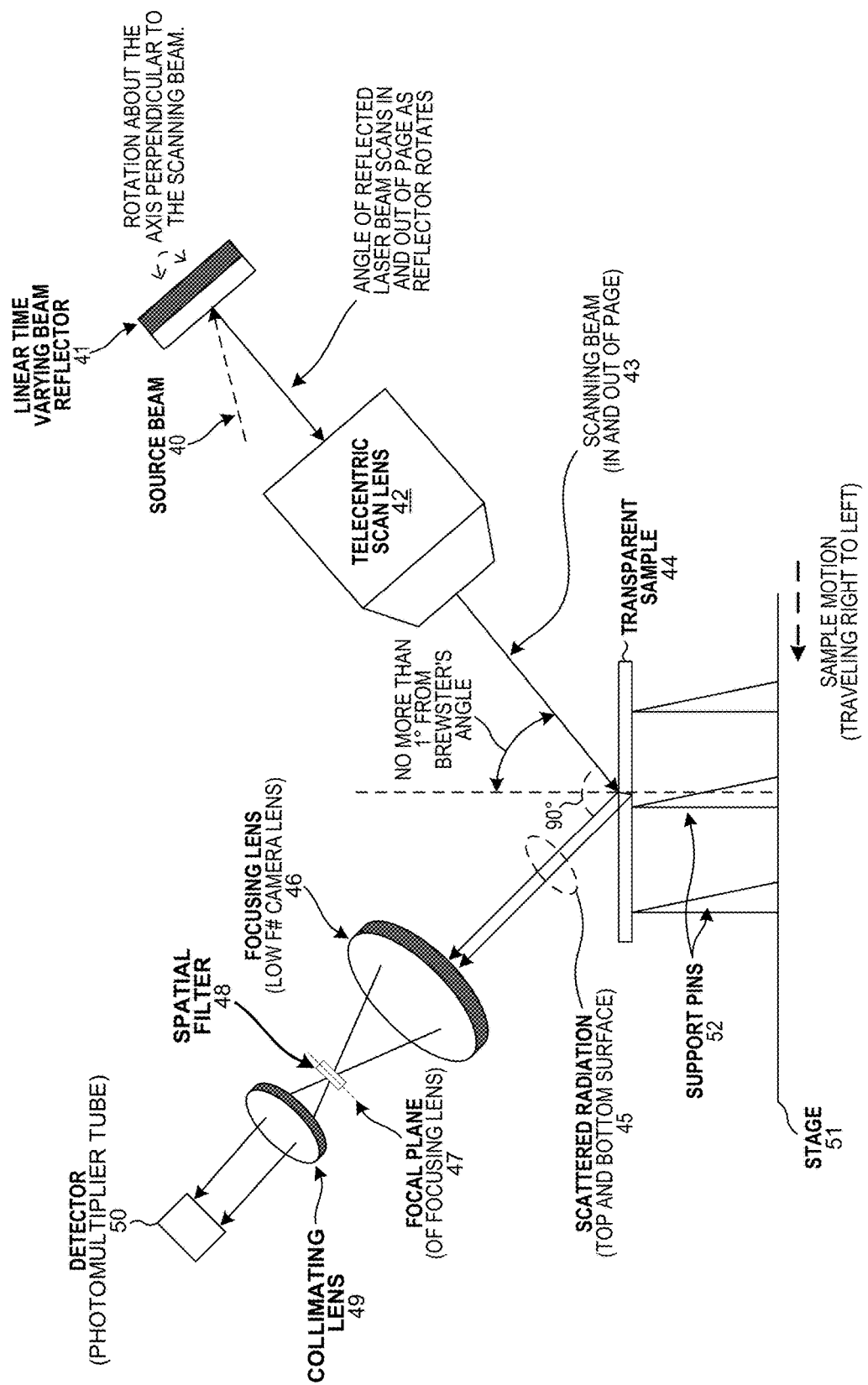
FIG. 10 is a diagram of a scattered radiation optical inspector.

FIG. 10 is a diagram of a scattered radiation optical inspector. The scattered radiation optical inspector includes a radiating source (not shown) that outputs a source beam 40, a time varying beam reflector 41, a telecentric scan lens 42, a focusing lens 46, a spatial filter 48, a collimating lens 49 and a detector 50.

In operation, the radiating source emits source beam 40 which irradiates time varying beam reflector 41. The time varying beam reflector 41 reflects the source beam 40 to the telecentric scan lens 42. The time variance of the time varying beam reflector 41 causes a moving spot (scanning beam 43) to irradiate transparent sample 44. The time varying beam reflector 41 and the telecentric scan lens 42 are configured so to irradiate the transparent sample 44 with the scanning beam 43 at an angle of incidence that is not more than one degree from the Brewster's angle of the transparent sample 44. The focusing lens 46 is configured to be irradiated by scattered radiation from the transparent sample 44. The scattered radiation is radiated from the top surface of the transparent sample 44, as well as from the bottom surface of the transparent sample 44. The focusing lens 46 can be referred to as a collector of light. In one example, the focusing lens 46 is configured to be oriented along an axis that is perpendicular to the plane incidence of scanning beam 43. In one example, the focusing lens 46 is a low F-number camera lens. The focusing lens 46 focuses light to a focal plane 47. The spatial filter 48 is located at focal plane 47 and operates to filter out the scattered radiation from the bottom surface of the transparent sample 44, while allowing the scattered radiation from the top surface of the transparent sample 44 to pass through to collimating lens 49. The collimating lens 49 is configured along an axis that is perpendicular to the scanning beam 43. In one example, the spatial filter 48 is a slit shaped spatial filter to remove the scattered light from the bottom surface of the transparent sample 44. In another example, the collimating lens 49 is a pair of achromatic lenses that shape the scattered radiation into a circular spot that irradiates detector 50. In yet another example, detector 50 is a photomultiplier tube.

In another example, the scattered radiation optical inspector further includes a processor and a memory. The processor functions to read the output signals generated by the detector 50 and store the light intensity values indicated by the output signals in the memory. The processor may also function to determine the presence of defects and the type of defects. The processor may also function to generate a mapping of defects across the area of the transparent sample. The processor may also be configured to communicate the mapping of defects to another device or to a monitor.

The scattered radiation optical inspector described above gathers scattered radiation from the irradiated transparent sample 44 at an angle that is near perpendicular from the angle of incidence of the scanning beam 43. Moreover, the scattered radiation optical inspector can separate scattered radiation from the top surface of the transparent sample from scattered radiation from the bottom surface of the transparent sample, which provides the valuable ability to detect defects on a single side of a transparent sample.

The scattered radiation optical inspector can be integrated with the phase retardance optical inspector of FIG. 3 because both inspectors require that the transparent sample be irradiated at an angle of incidence that is not more than one degree from the Brewster's angle of the transparent sample.

Figure 11:
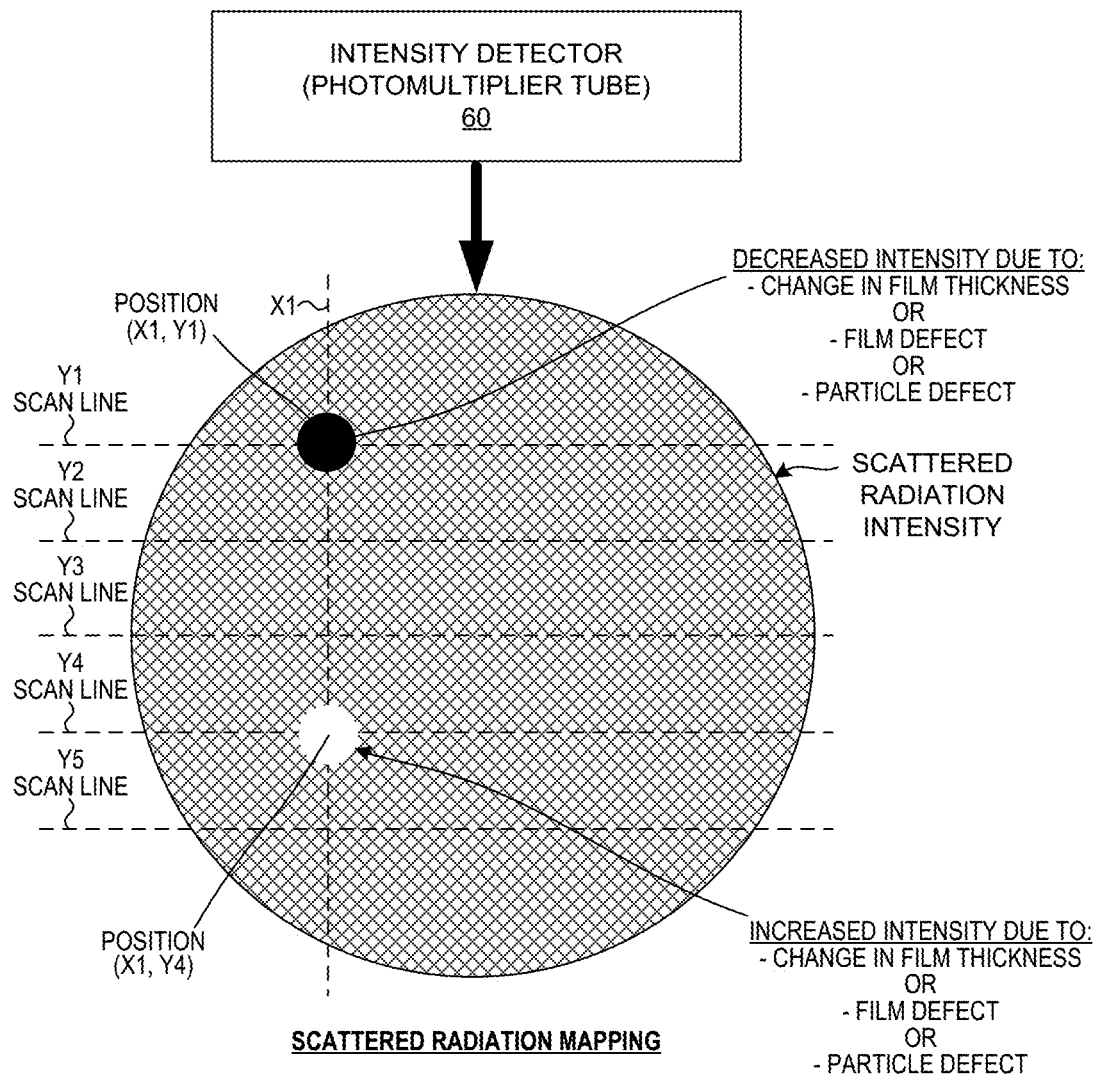
FIG. 11 is a diagram of a scattered radiation mapping illustrating detection of defects by way of detecting changes in the intensity of scattered radiation.

FIG. 11 is a diagram of a scattered radiation mapping illustrating detection of defects by way of detecting changes in the intensity of scattered radiation from one surface of the transparent sample. For example, the scattered radiation mapping may show a location where there is a decrease in measured intensity by detector 50. This decrease in measured intensity can be an indicator of a change in film thickness, a film defect, or a particle defect. In another example, the scattered radiation mapping may show a location where there is an increase in measured intensity by detector 50. This increase in measured intensity can be an indicator of a change in film thickness, a film defect, or a particle defect.

Figure 12:
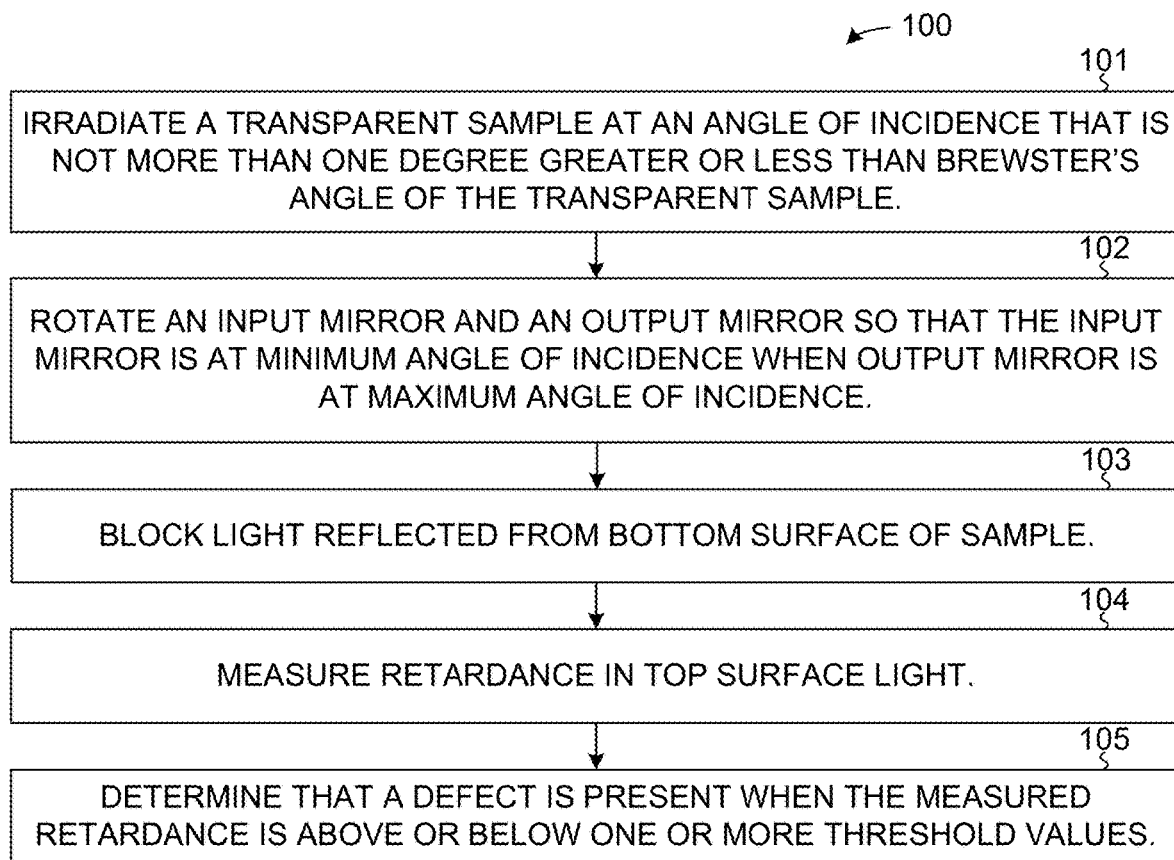
FIG. 12 is a flowchart illustrating the steps to perform phase retardance defect detection.

FIG. 12 is a flowchart 100 illustrating the steps to perform phase retardance defect detection. In step 101, a transparent sample is irradiated at an angle of incidence that is not more than one degree greater or less than the Brewster's angle of the transparent sample. In step 102, an input mirror and an output mirror are rotated so that the input mirror is at a minimum angle of incidence when the output mirror is at a maximum angle of incidence. In step 103, light reflected from the bottom surface of the sample is blocked. In step 104, the retardance (polarization change) of the light reflected from the top surface is measured. In step 105, it is determined if a defect is present at the scan location based on the measured retardance and one or more threshold values.

Figure 13:
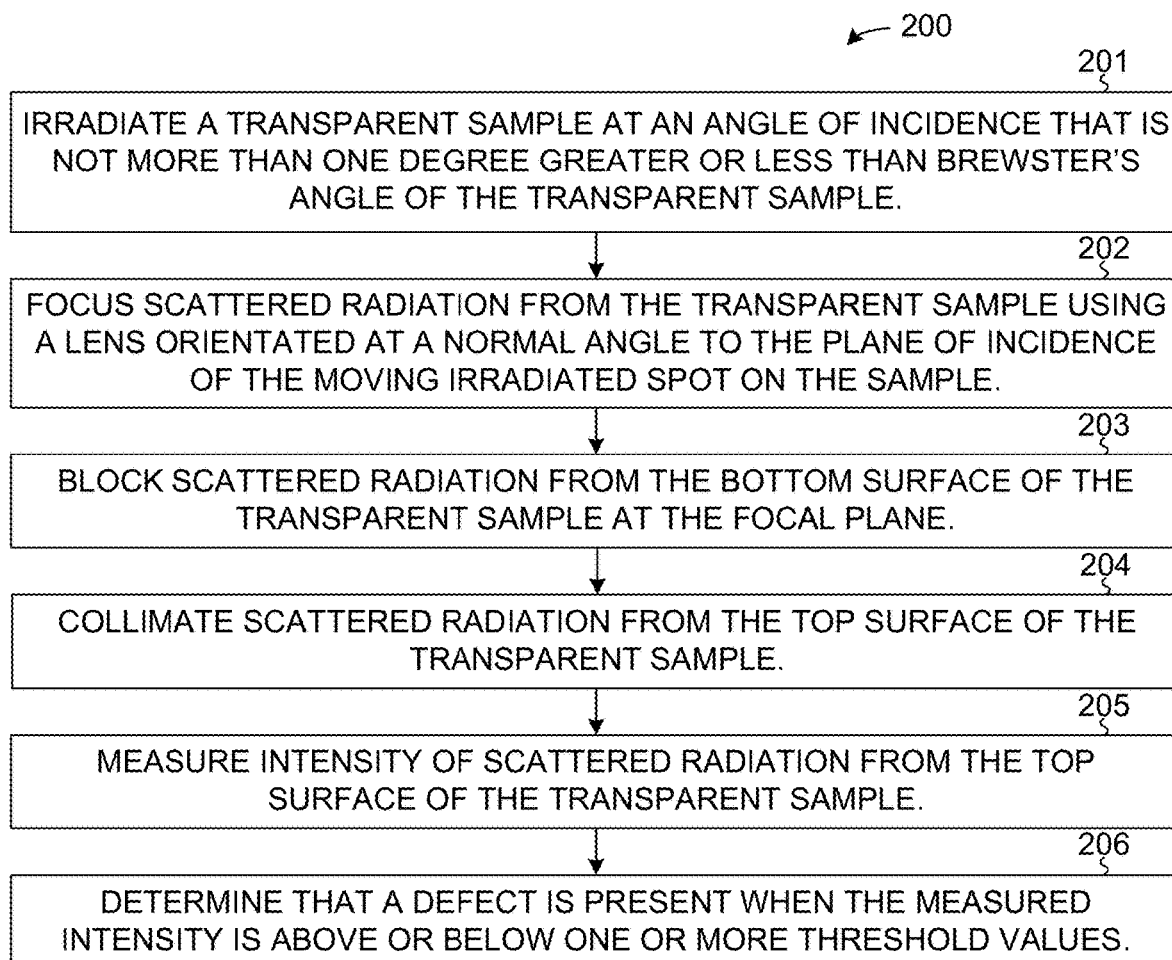
FIG. 13 is a flowchart illustrating the steps to perform scattered radiation defect detection.

FIG. 13 is a flowchart 200 illustrating the steps to perform scattered radiation defect detection. In step 201, a transparent sample is irradiated at an angle of incidence that is not more than one degree greater or less than the Brewster's angle of the transparent sample. In step 202, the scattered radiation from the transparent sample is focused using a lens orientated at a normal angle to the plane of incidence of the moving irradiated spot on the sample. In step 203, the scattered radiation from the bottom surface of the transparent sample is blocked. In step 204, the scattered radiation from the top surface of the transparent sample is collimated. In step 205, the intensity of the scattered radiation from the top surface of the transparent sample is measured. In step 206, a determination is made as to whether a defect is present at the scan location based on the measured intensity and one or more threshold values.

Region Prober Optical Inspector

Figure 14:
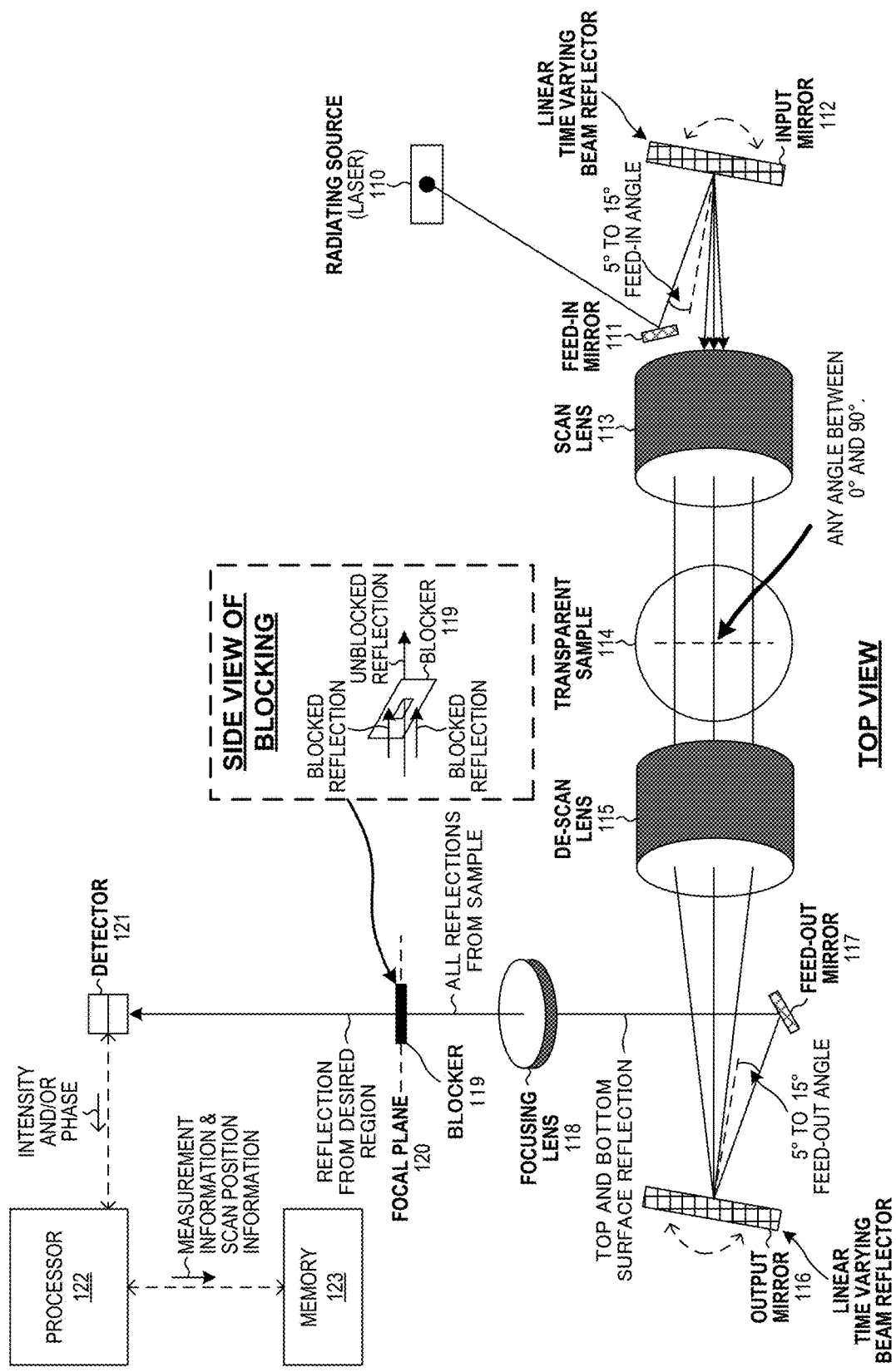
FIG. 14 illustrates a novel region prober optical inspector.

FIG. 14 illustrates a novel region prober optical inspector. In one embodiment, a region prober optical inspector includes a radiating source 110, a feed-in mirror 111, a linear time varying beam reflector 112, a scan lens 113, a de-scan lens 115, a linear time varying beam reflector 116, a feed-out mirror 117, a focusing lens 118, a blocker 119 that is located at the focusing lens focal plane 120, and a detector 121. The region probing optical inspector may further include a processor 122 and memory 123 that are configured to process and store an intensity and/or phase output signal received from detector 121.

In one example, the input mirror 112 and output mirror 116 are linear time varying beam reflectors, which vary the angle of reflection linearly as they are rotated. Input mirror 112 and output input mirror 116 may also be controlled by an electrical signal, such as a signal generator. Input mirror 112 and output input mirror 116 may be referred to as galvanometer mirrors.

In one example, the detector is a bi-cell detector. An example of a bi-cell detector is illustrated in FIG. 4. A bi-cell detector has a center line 31 that separates a first photo sensor from a second photo sensor. The bi-cell detector can be configured so that it outputs a first signal that indicates the difference between the light intensity measured by one side of the detector and the light intensity measured by another side of the detector. The bi-cell detector also can be configured so that it outputs a second signal that indicates the summation of the light intensity measured by one side of the detector and the light intensity measured by another side of the detector.

In operation, the radiating source 110 outputs a laser beam. In one optional embodiment, the phase of the output laser beam can be adjusted by a half wave plate that is located along the path of the output laser beam. The output laser beam irradiates feed-in mirror 111 and is reflected toward input mirror 112 and then reflected to scan lens 113. Scan lens 113 operates to focus the scanning beam onto the transparent sample. In one example, the scan lens 113 is a telecentric scan lens. Scan lens 113 is configurable such that the scanning beam output from the scan lens 113 irradiates the transparent sample 114 at an angle that is not more than one degree from Brewster's angle of the transparent sample 114. Another type of lens which may replace the scan lens is an achromat.

In one example, the transparent sample is glass. In another example, the transparent sample is a thin film deposited on a transparent material. Other examples of transparent samples include but are not limited to: sapphire, fused silica, quartz, silicon carbide, and polycarbonate.

De-scan lens 115 operates to focus the signal from the transparent sample onto output mirror 116. In one example, the de-scan lens 115 a telecentric scan lens that is substantially identical to scan lens 113. De-scan lens 115 can be a telecentric lens or an achromat lens. Utilization of substantially identical lens for scan lens 113 and de-scan lens 115 allows the system to focus on light reflecting from a very thin cross section region of the transparent sample. Other examples of a de-scan lens include, but are not limited to: spherical singlet, spherical doublets, triplet, or aspheric lens.

Feed-out mirror 117 operates to reflect the signal from the output mirror 116 to focusing lens 118. Focusing lens 118 has a focal plane 120. At the focus of the focusing lens 118 there will be two spots (provided the sample is transparent and no defects are present) and these spots correspond to signals from the top and bottom surfaces of the sample. In one example, focusing lens 118 is an achromatic lens. Other examples of a focusing lens include but are not limited to: spherical singlet, spherical doublets, triplet, or aspheric lens.

In one example, the light reflected by output mirror 116 irradiates the feed-out mirror at an angle that is not greater than thirty degrees from the normal angle of output mirror 116 (the second time varying beam reflector) when output mirror 116 is positioned at a mid-point of output mirror 116 rotational range.

Figure 15:
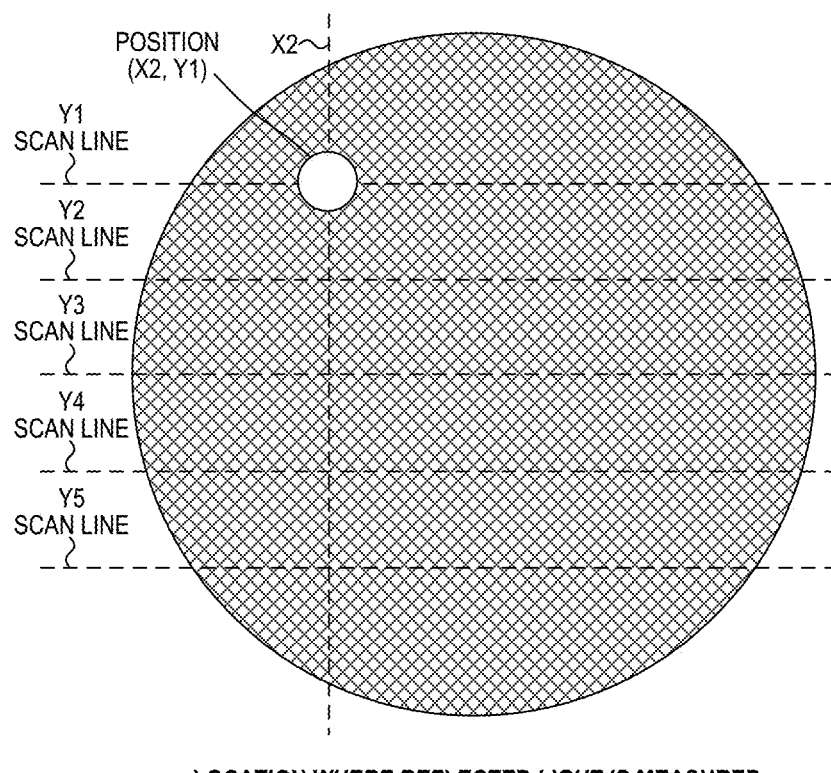
FIG. 15 illustrates an example location to be probed on a transparent sample.

Blocker 119 is located near the focal plane 120 and operates to block all but a portion of the signal from the transparent sample that is within the desired region of the transparent sample. For example, as illustrated in FIG. 14, blocker 119 may be configured so as to block signal from the bottom surface of the transparent sample and the top surface of the transparent sample, while allowing the signal from a desired region of the transparent sample to pass. An expanded illustration of one embodiment of blocker 119 is shown in FIG. 14. The expanded illustration shows the blocker as a slit with a center opening that allows light to pass while blocking the remainder of blocked light. It is noted herein that other blocker configurations can be used to achieve the desired blocking. FIG. 15 illustrates an example location to be probed on a transparent sample.

Figures 17, 18:
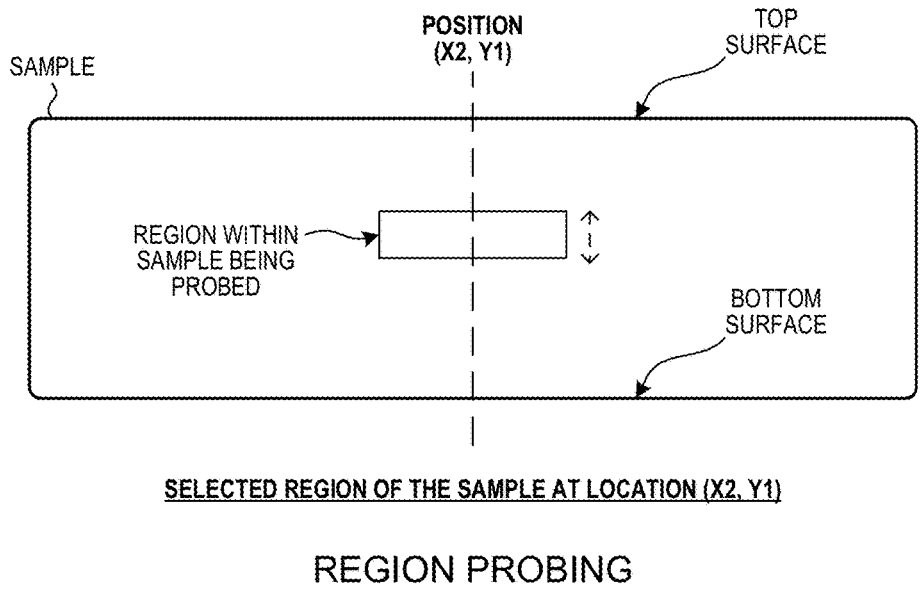
FIG. 17 illustrates an example of a desired region of the transparent sample that is to be probed.
FIG. 18 is a table illustrating how the presence of a defect in a probed region is detected using a threshold value.

FIG. 17 illustrates an example of a desired region of the transparent sample that is to be probed. Examination of FIG. 17 shows that the desired region to be probed within the transparent sample does not include the top surface or the bottom surface of the transparent solid. Rather, the desired region to be probed only includes a narrow interior region of the transparent sample. It is noted that the desired probing region illustrated in FIG. 17 is exemplary and in operation any region up to and including the top and bottom surfaces of the transparent sample may be part of the desired probing region.

Figure 16:
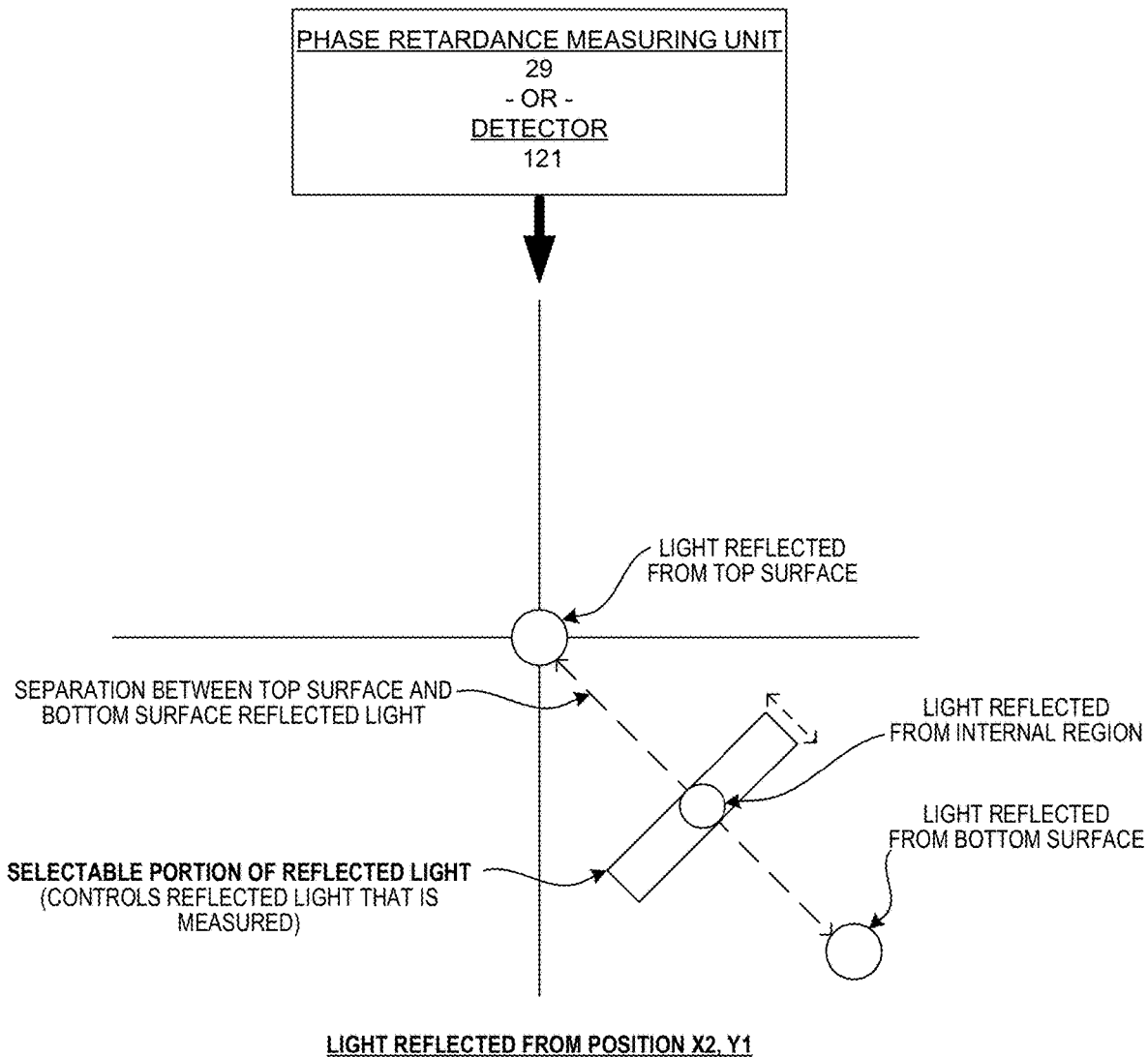
FIG. 16 illustrates the area of reflected light blocked by blocker 119 from the perspective along the path of the reflected light.

FIG. 16 illustrates the area of reflected light blocked by blocker 119 from the perspective along the path of the reflected light. The location of the light reflected from different regions of the transparent sample vary from the center point (top surface reflection) along a line that terminates at the location where bottom surface location is present. The selectable portion of reflected light illustrated in FIG. 16 is controlled by blocker 119 as described above. Accordingly, adjusting the slit width of blocker 119 and the location of blocker 119 will adjust the height and location of the region of the transparent sample that will travel past blocker 119 and be subsequently probed for defect detection.

In this fashion, the region probing optical inspector is able to differentiate reflections originating from the desired region of the transparent sample from reflections originated from outside of the desired region of the transparent sample. In one example, the blocker 119 is a mirror. Other examples of blocker materials include but are not limited to: an absorbing material, a blackened piece of aluminum, and a black painted piece of metal.

An optional collimating lens (not shown) may be used to collimate the signal from the transparent sample that is not blocked by blocker 119. In one example, the collimating lens is an achromatic lens. Other examples of a collimating lens include but are not limited to: spherical singlet, spherical doublets, triplet, or aspheric lens.

The unblocked light reflected from the desired region of the transparent sample then irradiates the detector 121. In response to being irradiated, detector 121 outputs a signal that is proportional to the intensity of light that irradiates detector 121. The output signal is then processed by processor 122 to determine if a defect is present in the desired region of the transparent sample 114.

FIG. 18 illustrates the use of threshold values to determine if a defect is present in the desired region of the transparent sample. The measured intensity of the reflected light from the desired region of the transparent sample that passes the blocker 119 is compared with a threshold value. In one example, when the measured intensity is greater than the threshold value, it is determined that a defect is present in the desired probing region. Alternatively, when the measured intensity is less than or equal to the threshold value, it is determined that a defect is not present in the desired probing region.

It also noted herein, that the phase retardance optical inspector illustrated in FIG. 3 may also be utilized to implement a region prober optical inspector. As described above regarding FIG. 3, the phase retardance optical inspector can be used to measure changes in phase of the measured reflected light from the transparent sample. Using the blocker 119 as described regarding FIG. 14 and the phase retardance measuring unit of FIG. 3 in combination allows for the detection of defects by analyzing changes in the phase of the reflected light instead of changes in the intensity of the reflected light. In this scenario, the polarization of the reflected light that passed blocker 119 can be compared to one or more threshold values to determine if a defect is present in the desired probing region.

Figure 19:
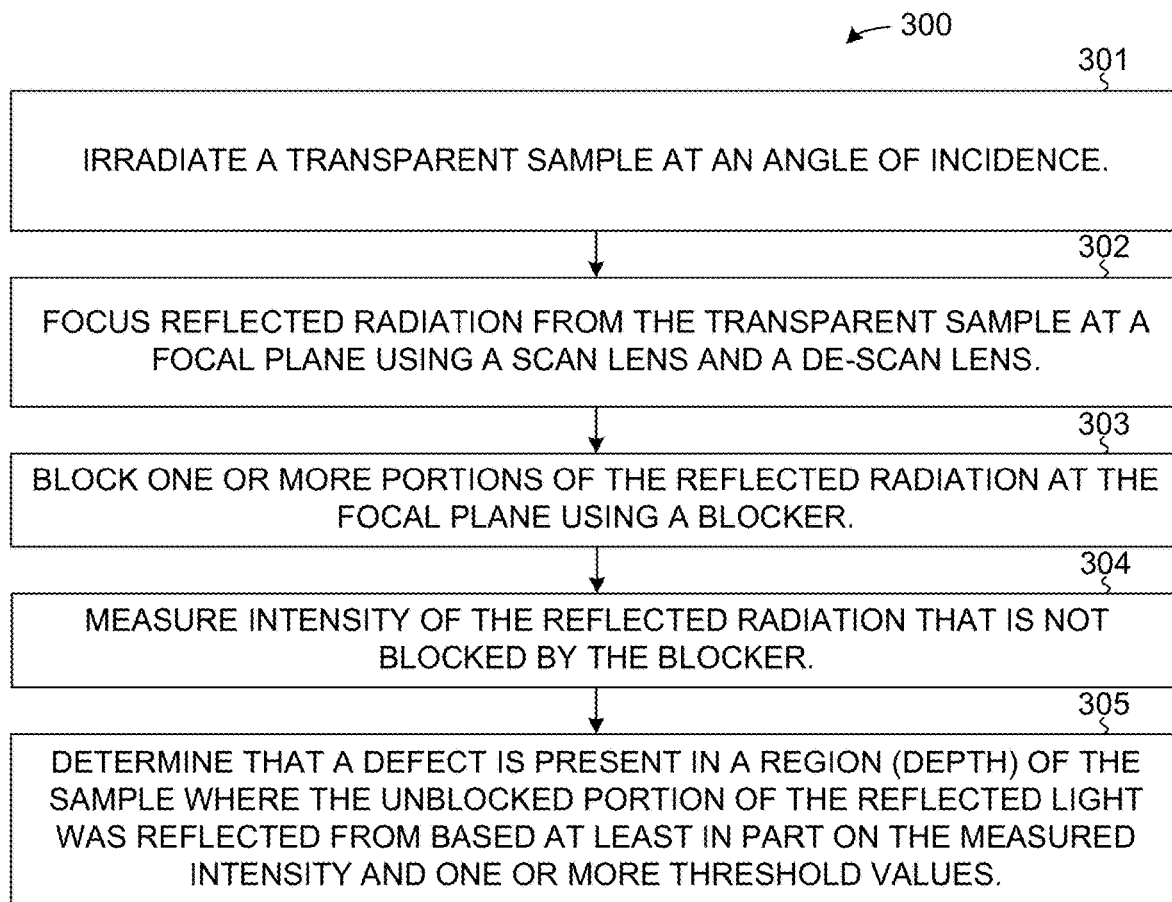
FIG. 19 is a flowchart 300 illustrating the steps of region probing to detect defects within a desired region of a transparent sample.

FIG. 19 is a flowchart 300 illustrating the steps of region probing to detect defects within a desired region of a transparent sample. In step 301, the transparent sample is irradiated at an angle of incidence that is between zero and ninety degrees of the surface of the transparent sample. In step 302, reflected radiation from the transparent sample is focused at a focal plan using a scan lens and a de-scan lens. In step 303, one or more portions of the reflected radiation are blocked at the focal plan using a blocker. In step 304, the intensity of the reflected radiation that is not blocked by the blocker is measured. In step 305, the presence of a defect in a region of the transparent sample where the unblocked portion of the reflected light was reflected from is determined based at least in part on the measured intensity and one or more threshold values.

Defect Detection Utilizing Multiple Measured Polarization Values

In addition to determining that a defect is present in desired probing region by comparing a single intensity or a single-phase measurement with a set threshold value, the presence of a defect can be determined by comparing a single measurement with a group of other measurement values taken from the same sample. The optical inspector of FIG. 3 can be used as described above at multiple locations on the transparent sample. The group of measurements taken at the multiple locations can then be post processed to determine if a defect is present at each measured location on the transparent sample.

In one example, the presence of a defect at first location on the sample is determined by comparing the single measured polarization at the first location with an average of measured polarization values within a predefined distance from the first location on the sample. In this fashion, all the measured polarization values with the predefined distance from the first location and summed and divided by the count of qualifying measurements. The resulting average polarization value for the group is then compared to the single polarization measurement taken at the first location.

In a first embodiment, if the measured phase value is greater or less than the average polarization value of the group plus or minus some threshold, then it is determined that a defect is present at the first location. If the measured phase value is less than or equal to the average polarization value of the group plus or minus some threshold, then it is determined that a defect is not present at the first location. Depending upon the nature of the defect, a measured phase value which is greater or less than the average value plus or minus a threshold can be considered a defect.

In a second embodiment, if the measured phase value is greater than the average polarization value of the group by more than a threshold value, then it is determined that a defect is present at the first location. If the measured phase value is less than the average polarization value of the group by more than a threshold value, then it is determined that a defect is not present at the first location.

In another example, the presence of a defect at first location on the sample is determined by comparing the single measured polarization at the first location with a median of measured polarization values within a predefined distance from the first location on the sample. In this fashion, all the measured polarization values with the predefined distance from the first location are sorted and then counted. The value at the position of the total count divided by two is selected as the median value. The resulting median polarization value for the group is then compared to the single polarization measurement taken at the first location.

In a first embodiment, if the measured phase value is greater than the median polarization value of the group by more than a threshold value, then it is determined that a defect is present at the first location. If the measured phase value is less than or equal to the median polarization value of the group by more than a threshold value, then it is determined that a defect is not present at the first location.

Figure 25:
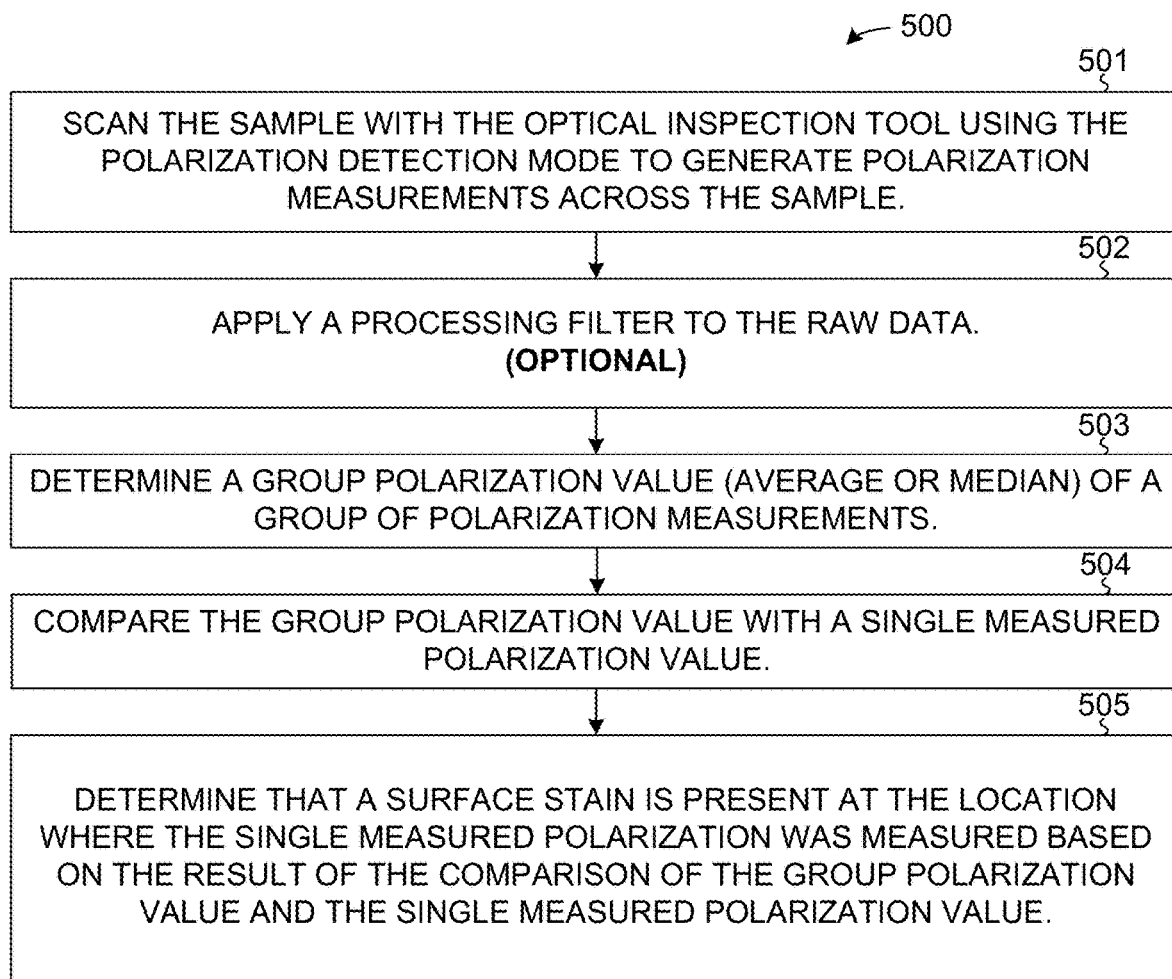
FIG. 25 is a flowchart 500 illustrating the steps of defect detection utilizing multiple measure polarization values.

FIG. 25 is a flowchart 500 illustrating the steps of defect detection utilizing multiple measured polarization values. In step 501, the sample is scanned using the region probing optical inspector to measure polarization values across the sample. In step 502, a processing filter is applied to the raw measured data. This step is optional. In step 503, a group polarization value (average or median) of a group of polarization measurements is determined. In step 504, the group polarization value is compared with a single measured polarization value. In step 505, presence of a defect at the location where the single measured polarization was measured is determined based on the result of the comparison of the group polarization value and the single measured polarization value.

Scattered Radiation Defect Depth Detection

As described above, using the scattered radiation optical detector of FIG. 10, defects can be detected by analyzing a single scattered radiation measurement. However, the scattered radiation optical detector of FIG. 10 can be used in a new and novel way to detect defects by analyzing the distance between multiple scattered radiation events. This new and novel use of the scattered radiation optical detector of FIG. 10 also removes the requirement that the scanning beam be oriented at an incident angle that is not more than one degree greater or less than Brewster's angle of the transparent sample. Rather, the new and novel use of the scattered radiation optical detector of FIG. 10 allows the scanning beam to be oriented at any incident angle.

This new and novel use of the scattered radiation optical detector of FIG. 10 can determine the x, y and z location of a defect by analyzing the distance between multiple scattered radiation events. A scattered radiation event is when the intensity of the measured scattered radiation is greater than a threshold intensity value.

Figure 20:
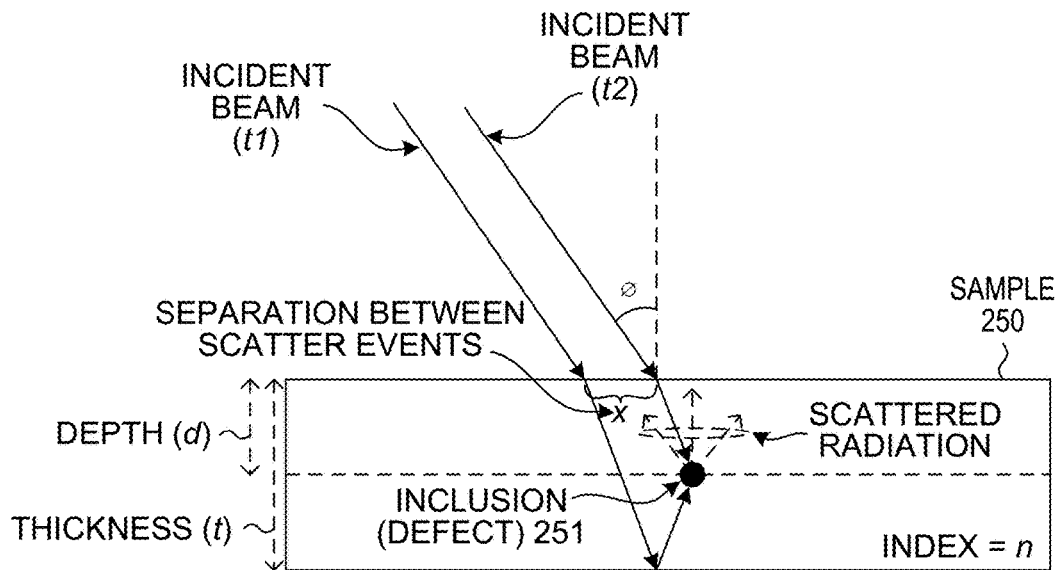
FIG. 20 illustrates the two scattered radiation events caused by an inclusion.

A first example of defect depth detection is illustrated in FIG. 20. An inclusion (defect) 251 is located at a depth d within the transparent sample 250. At time t1, the incident beam radiates the transparent sample 250 at an incident angle of Ø degrees from normal. Due to the transparent sample's index of refraction n, the light is redirected to a different angle as it travels from the top surface of the transparent sample to the bottom surface of the transparent sample. When the light reaches the bottom surface of the transparent sample, light is reflected upwards at an equal but opposing angle. The light travels at this equal and opposing angle until the reflected light reaches the top surface of the transparent sample, where the reflected light is redirected to an angle equal and opposite to the incident angle. Given that the path the light travels through the transparent sample is known, then the presence and the depth of a defect can be detected by analyzing multiple scattered radiation events measured along a single axis.

The following equation is the relationship between the thickness of the transparent sample (t), separation between scattered radiation events (x), the index of refraction of the transparent sample (n), the angle of incidence of the scanning beam (Ø), and the depth of the defect (d).

$$d = t - \frac{x\sqrt{n^2 - \sin^2\emptyset}}{2\sin\emptyset}$$

This equation is correct as long as the separation between scattered radiation events is within a specific range.

When the separation between scattered radiation events is greater than a first threshold, it is determined that the defect or particle is located at the bottom surface of the transparent sample.

Figure 21:
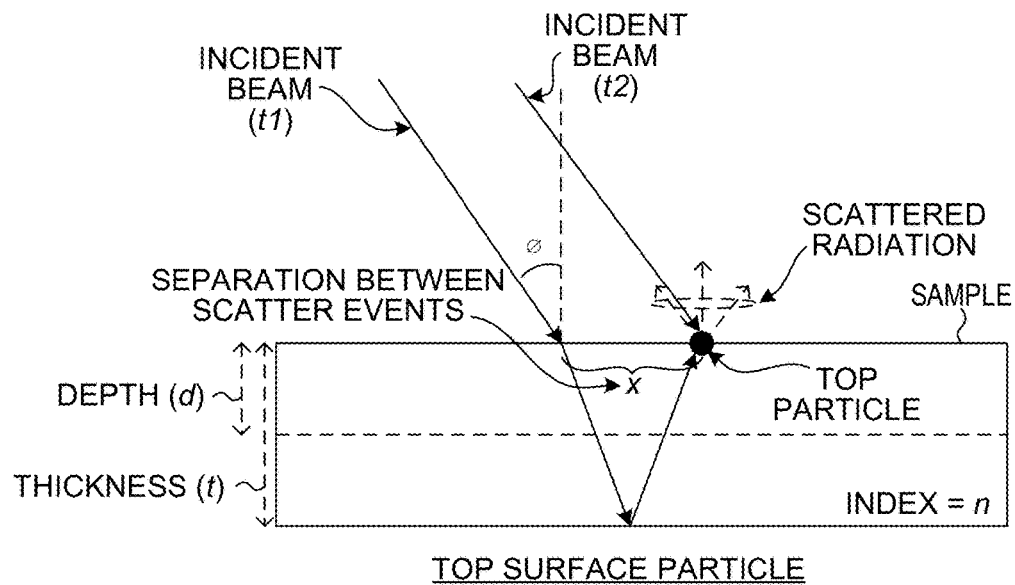
FIG. 21 illustrates the two scattered radiation events caused by a top surface particle.

FIG. 21 illustrates the two scattered radiation events caused by a top surface particle. At time t1, the incident beam enters the transparent sample, reflects from the bottom surface of the transparent sample and irradiates the top surface particle as the beam exits the top surface of the transparent sample. This causes a first scattered radiation event at time t1. At time t2, the incident beam irradiates the top surface particle before the beam has a chance to enter the transparent sample. This causes a second scattered radiation event. These two scattered radiation events caused by a top surface particle will always be the same distance apart for a given transparent wafer with a constant thickness and index of refraction. Therefore, any separations between scattered radiation events that are greater than, or less than, this fixed distance are not top surface particles. The other criterion place upon the two scattering events is that they must be directly above one another, namely they must have the same x coordinate (within a specified tolerance).

FIG. 20 illustrates the two scattered radiation events caused by an inclusion (defect within the transparent sample). At time t1, the incident beam enters the transparent sample, reflects from the bottom surface of the transparent sample and irradiates the inclusion as the beam travels toward the top surface of the transparent sample. This causes a first scattered radiation event at time t1. At time t2, the incident beam enters the transparent sample and then irradiates the inclusion. This causes a second scattered radiation event. These two scattered radiation events caused by the inclusion will always be the closer together than the separation of the two scattered radiation events caused by a top surface particle. Therefore, any separations between scattered radiation events caused by a single inclusion (defects within the transparent sample) will never have a greater separation than scattered radiation events caused by a top surface particle. The other criterion place upon the two scattering events is that they must be directly above one another, namely they must have the same x coordinate (within a specified tolerance).

Accordingly, and two scattered radiation events that have a separation greater than the fixed separation (and have the same x coordinate) between scattered radiation events caused by a top surface particle are not caused by a top surface particle and are not caused by an inclusion particle. Thus, by process of elimination, the two scattered radiation events that have a separation greater than the fixed separation between scattered radiation events caused by a top surface particle must be the result of a bottom surface particle.

When the separation between scattered radiation events is less than the first threshold and greater than a second threshold, it is determined that the defect or particle is located at the top surface of the transparent sample. The reasoning of this second threshold is illustrated in FIG. 21. As discussed above, the two scattered radiation events caused by a top surface particle will always be the same distance apart for a given transparent wafer with a constant thickness and index of refraction. Therefore, as shown in FIG. 23, the separation range for top surface particles is relatively narrow because all top surface particles should cause two scattered radiation events at substantially similar distances. In practice, a narrow range is used to identify a top surface particle due to measurement precision and potential variations of particle size and shape. The other criterion place upon the two scattering events is that they must be directly above one another, namely they must have the same x coordinate (within a specified tolerance).

When the separation between scattered radiation events is less than the second threshold and greater than a third threshold, it is determined that the defect or particle is an inclusion defect located within the transparent sample (not a surface defect or particle) and the above equation is applicable to determine the depth of the defect in the transparent sample. As discussed above regarding FIG. 20, any separations between scattered radiation events caused by a single inclusion (defects within the transparent sample) will never have a greater separation than scattered radiation events caused by a top surface particle. Therefore, any substantial separation between scattered radiation events that is less than the fixed separation between scattered radiation events caused by top surface particles must be an inclusion.

Figure 22:
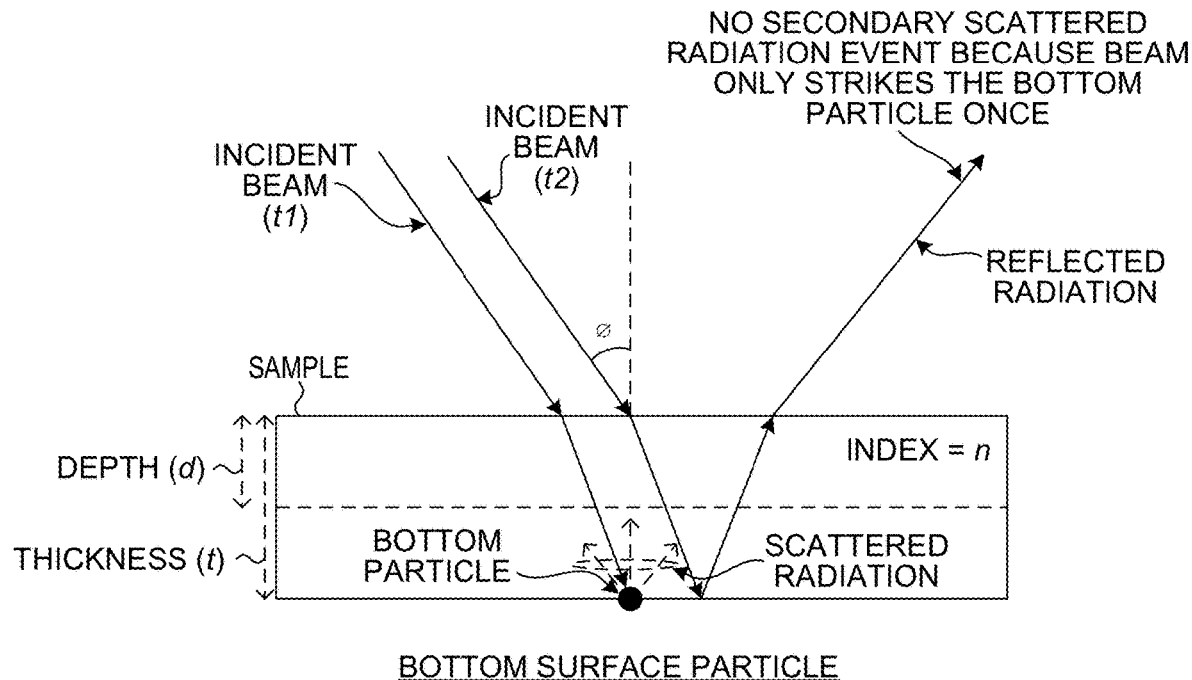
FIG. 22 illustrates a scattered radiation event caused by a bottom surface particle.

When the separation between scattered radiation events is less than the third threshold, it is determined that the defect or particle is located at the bottom surface of the transparent sample. The reasoning for this first threshold is illustrated in FIG. 22. FIG. 22 illustrates that a bottom surface particle is only irradiated by the incident beam at time t1. Therefore, theoretically there should only be a single scattered radiation event for bottom surface particles. However, due to measurement accuracy and variation of bottom surface particles size and shape, a practical range of very closely separate scattered radiation events are determined to be cause by a bottom surface particle.

FIG. 23 is an example of separation ranges between scattered radiation events for a five-hundred-micron thick transparent sample with a scan beam incident angle of 56.3° and an index of refraction of 1.5. When the separation between scattered radiation events is greater than a first threshold of six-hundred and eighty-six microns, it is determined that the defect or particle is located at the bottom surface of the transparent sample and the above equation is not applicable. When the separation between scattered radiation events is less than the first threshold of six-hundred and eighty-six microns and greater than a second threshold of six-hundred and forty-six microns, it is determined that the defect or particle is located at the top surface of the transparent sample. When the separation between scattered radiation events is less than the second threshold of six-hundred and forty-six microns and greater than a third threshold of twenty microns, it is determined that the defect or particle is an inclusion defect located within the transparent sample (not a surface defect or particle) and the above equation is applicable to determine the depth of the defect in the transparent sample. The other criterion place upon the two scattering events is that they must be directly above one another, namely they must have the same x coordinate (within a specified tolerance). When the separation between the scattered radiation events is less than the third threshold of twenty microns, it is determined that the defect or particle is located on the bottom surface of the transparent sample.

Figure 24:
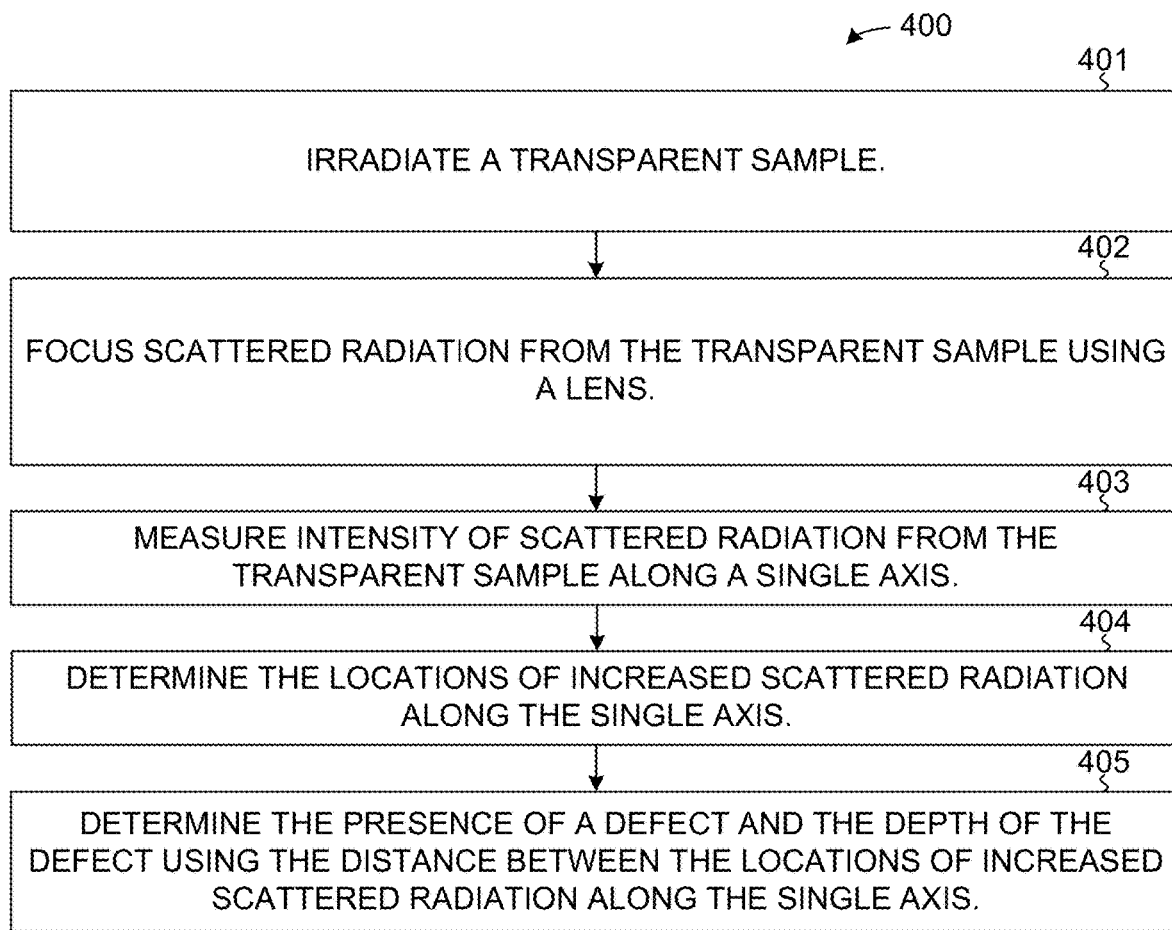
FIG. 24 is a flowchart 400 illustrating the steps to perform scattered radiation defect depth detection.
Figure 26:
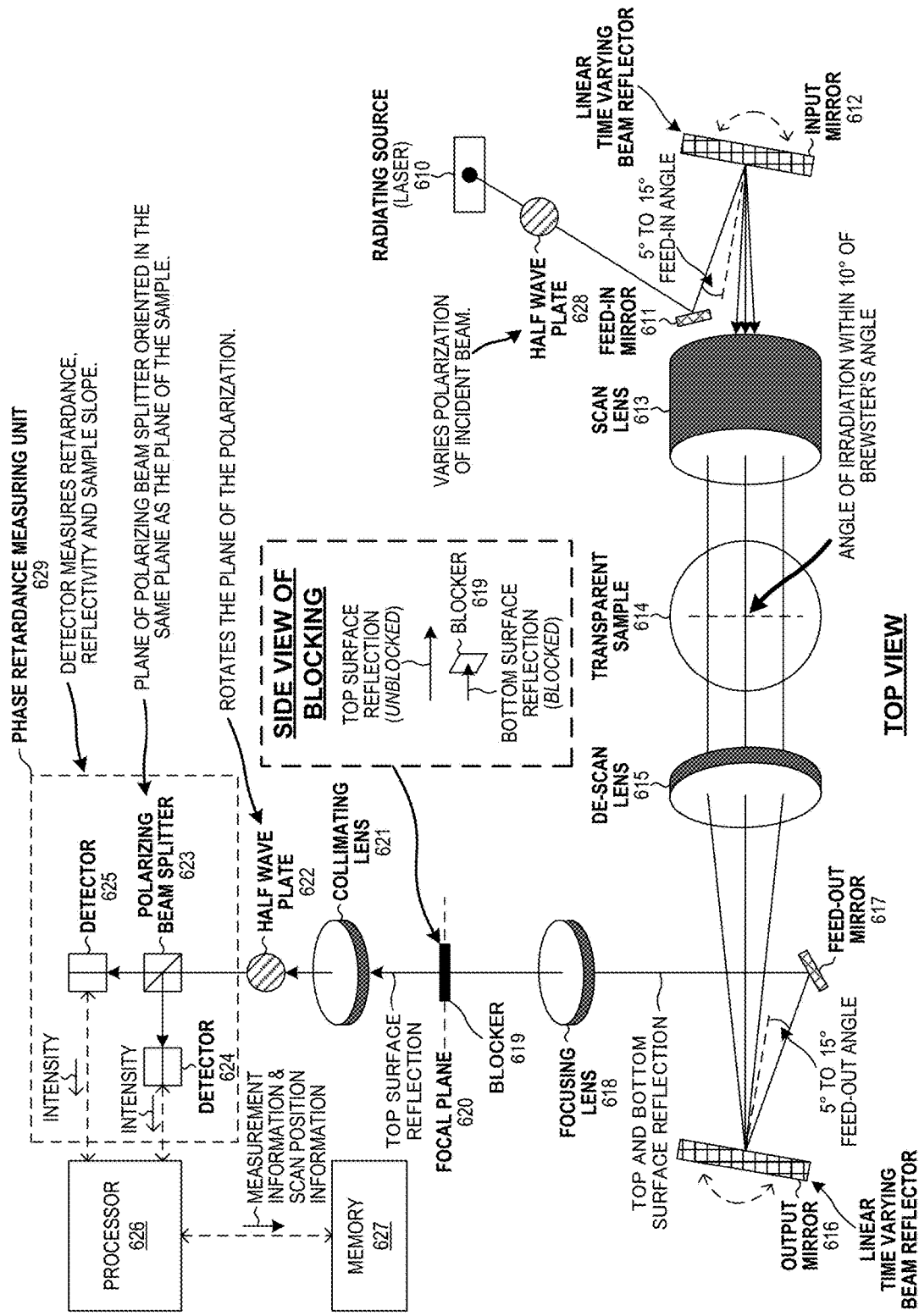
FIG. 26 is a diagram of another phase retardance optical inspector.

FIG. 24 is a flowchart 400 illustrating the steps to perform scattered radiation defect depth detection. In step 401, the transparent sample is irradiated. In step 402, scattered radiation from the transparent sample is focused using a lens. In step 403, the intensity of the scattered radiation from the transparent sample is measured along a single axis. In step 404, the locations of increase scattered radiation along the single axis are determined. In step 405, the presence of a defect and the depth of the defect are determined using the distance between the locations of increased scattered radiation along the single axis FIG. 26 is a diagram of another phase retardance optical inspector. Additional testing and research has indicated that the phase retardance optical inspector described above works well up to plus or minus ten (10) degrees from Brewster's angle (not only plus or minus 1 degree as disclosed in the parent application). The performance varies as the distance from Brewster's angle varies. For example, if the device operates at an incidence angle of 56.8 degrees (0.1 degrees from Brewster's angle) the difference between the 100 Angstroms of $MgF_2$ and the bare substrate is about 70 degrees of retardance. Whereas if the device operates at an incidence angle of 60 degrees the difference between the 100 Angstroms of $MgF_2$ and the bare substrate is about 10 degrees of retardance. So you give up a factor of seven times in sensitivity but the inspector still works even though you are operating at an angle which is 3.3 degrees away from the Brewster's angle of the substrate.

Figure 27:
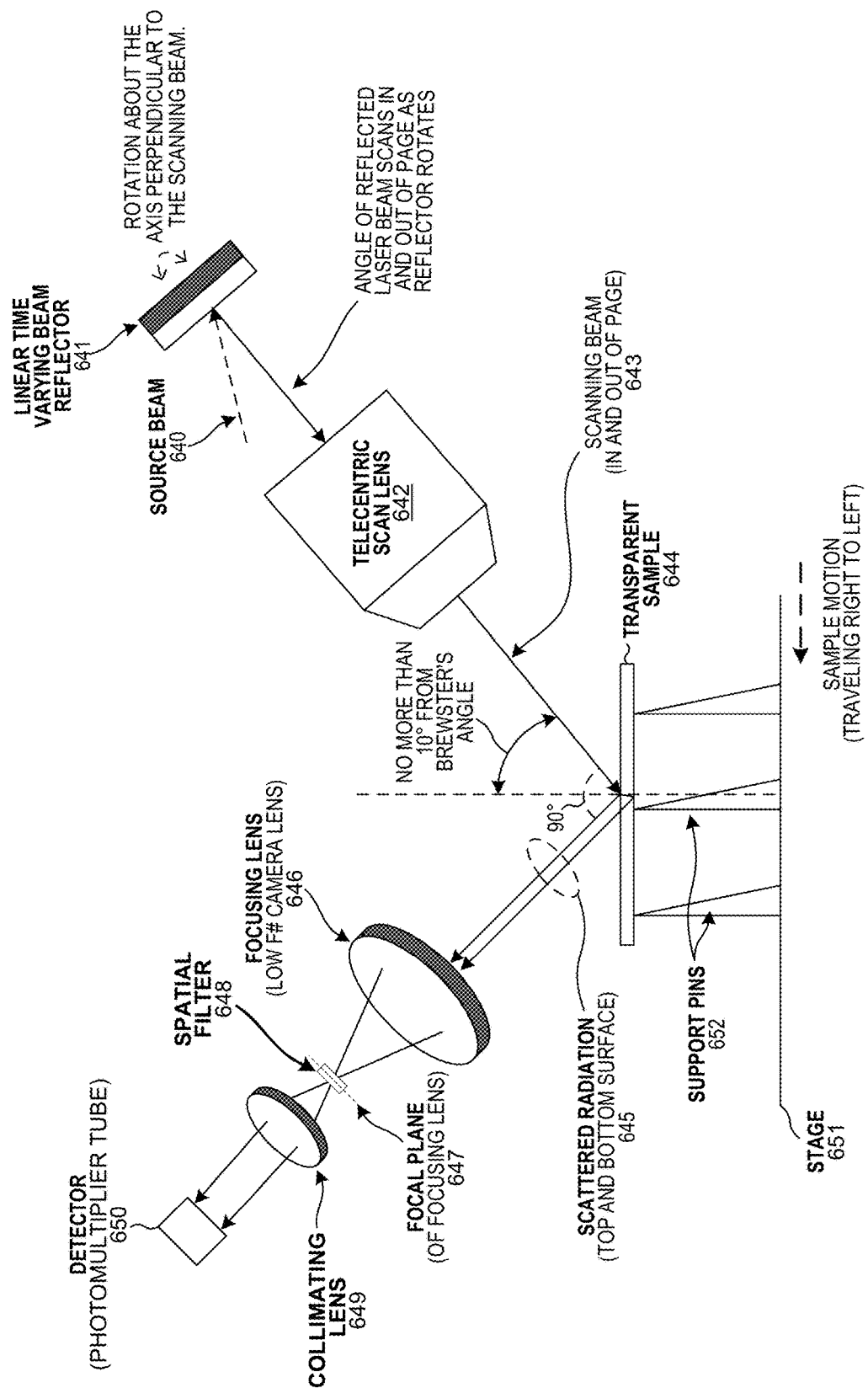
FIG. 27 is a diagram of another scattered radiation optical inspector.

FIG. 27 is a diagram of another scattered radiation optical inspector depicting an incident angle that is plus or minus ten (10) degrees of Brewster's angle.

Figure 28:
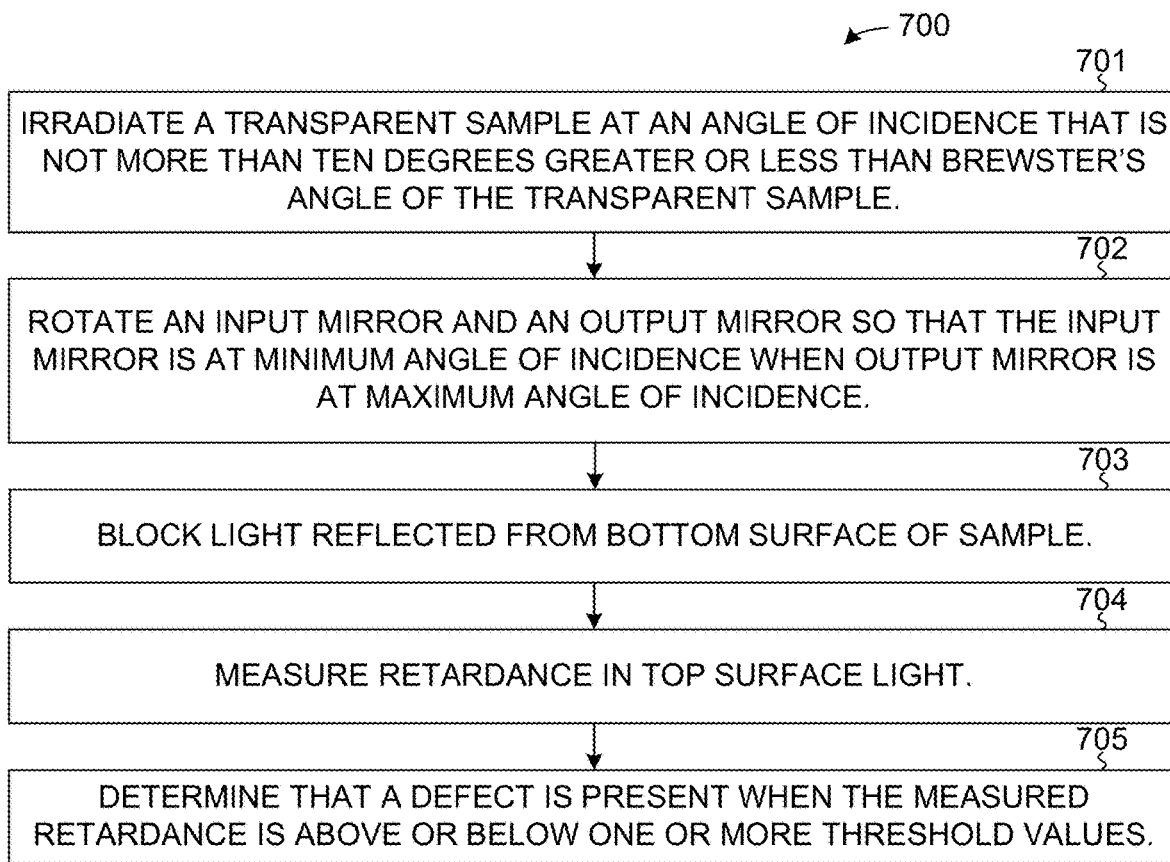
FIG. 28 is another flowchart illustrating the steps to perform phase retardance defect detection.

FIG. 28 is another flowchart illustrating the steps to perform phase retardance defect detection using an incident angle that is plus or minus ten (10) degrees of Brewster's angle.

Figure 29:
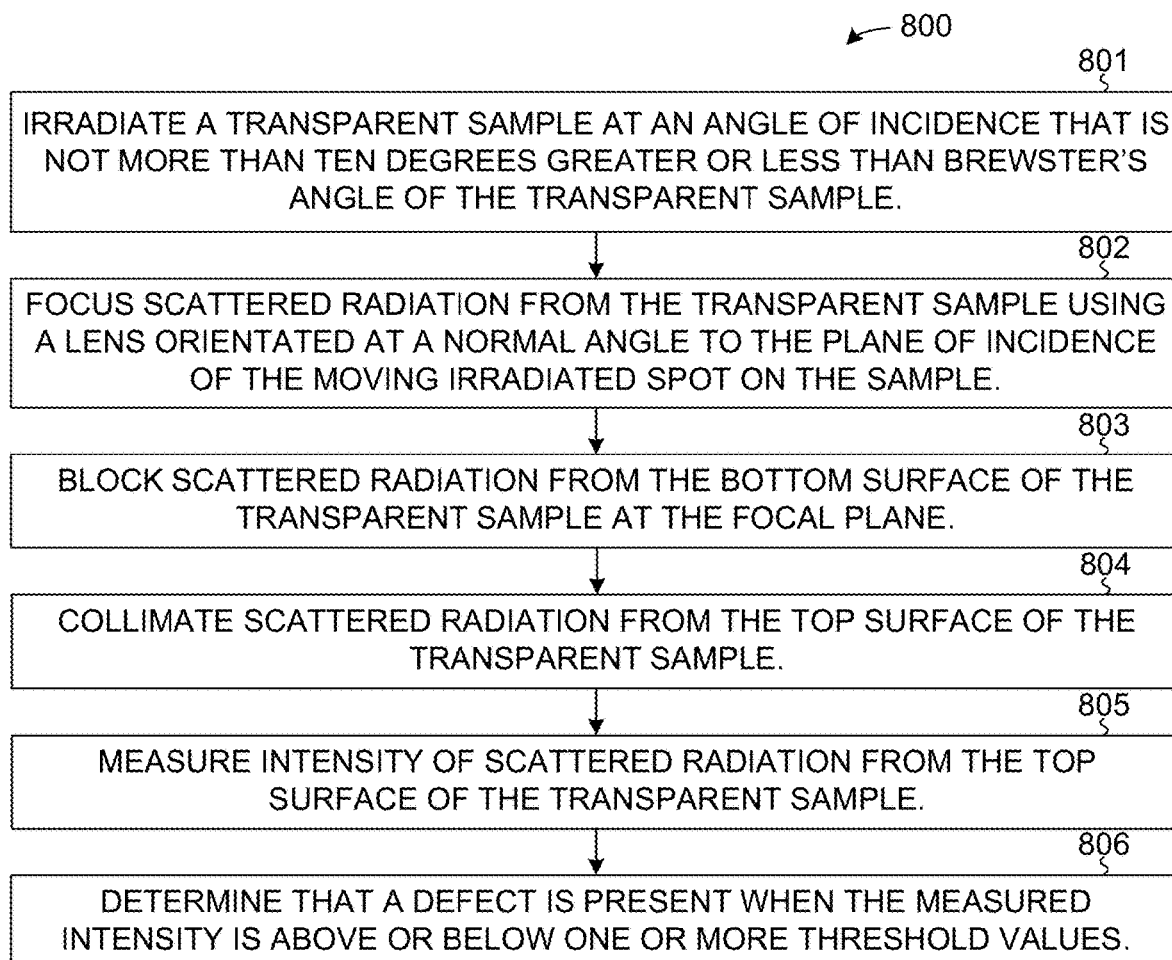
FIG. 29 is another flowchart illustrating the steps to perform scattered radiation defect detection.

FIG. 29 is another flowchart illustrating the steps to perform scattered radiation defect detection using an incident angle that is plus or minus ten (10) degrees of Brewster's angle.

Figure 30:
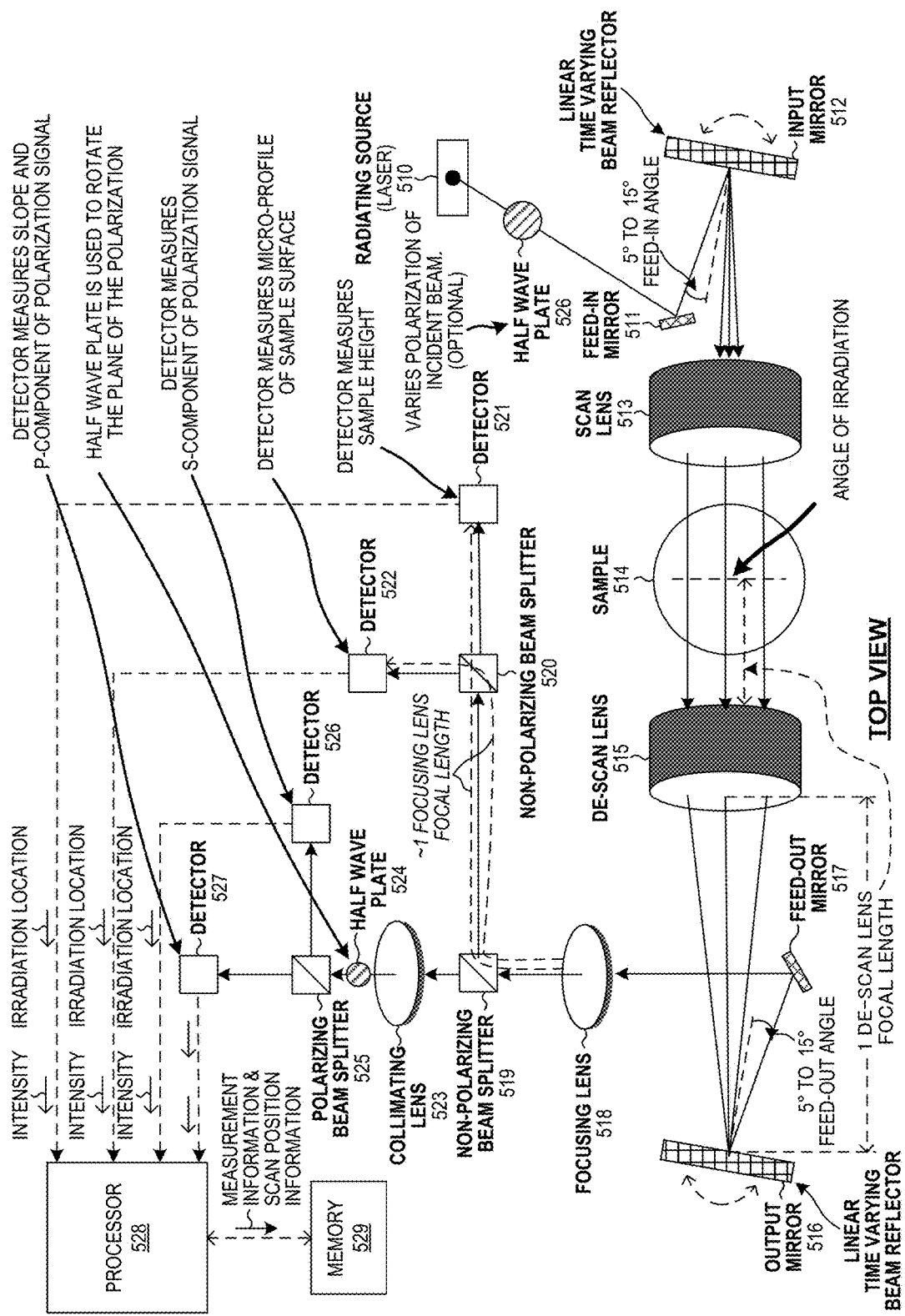
FIG. 30 is a diagram of an angle independent surface height optical inspector.

FIG. 30 is a diagram of an angle independent surface height optical inspector. In one embodiment, an angle independent surface height optical inspector includes a radiating source 510, a feed-in mirror 511, a linear time varying beam reflector 512, a scan lens 513, a de-scan lens 515, a linear time varying beam reflector 516, a feed-out mirror 517, a focusing lens 518, a non-polarizing beam splitter 519, a collimating lens 523, a half-wave plate 524, a polarizing beam splitter 525, a detector 526, a detector 527, a non-polarizing beam splitter 520, a detector 521, a detector 522, a processor 528 and a memory 529. Optionally, the angle independent surface height optical inspector may also include a half-wave plate 526.

The de-scan lens 515 is located at approximately one focal length of de-scan lens 515 from the sample 514. Similarly, the linear time varying beam reflector 516 is located approximately one focal length of the de-scan lens 515 from the de-scan lens 515.

The processor 528 and memory 529 that are configured to process and store an intensity, irradiation location and/or phase output signal received from detector 521, detector 522, detector 526 and detector 527.

In one example, the input mirror 512 and output mirror 516 are linear time varying beam reflectors, which vary the angle of reflection linearly as they are rotated. Input mirror 512 and output input mirror 516 may also be controlled by an electrical signal, such as a signal generator. Input mirror 512 and output input mirror 516 may be referred to as galvanometer mirrors.

In one example, the detectors 521, 522, 526 and 527 are any combination of bi-cell detectors, quad-cell detectors and/or position sensitive detectors. An example of a bi-cell detector is illustrated in FIG. 4. A bi-cell detector has a center line 31 that separates a first photo sensor from a second photo sensor. The bi-cell detector can be configured so that it outputs a first signal that indicates the difference between the light intensity measured by one side of the detector and the light intensity measured by another side of the detector. The bi-cell detector also can be configured so that it outputs a second signal that indicates the summation of the light intensity measured by one side of the detector and the light intensity measured by another side of the detector. A quad-cell detector includes four photo sensors. Usually, the four sensors are evenly sized and are separated by a center vertical line and a center horizontal line. The quad-cell detector can be configured so that it outputs a signal that indicates the difference between the light intensity measured by each photo sensor. The quad-cell detector also can be configured so that it outputs a second signal that indicates the summation of the light intensity measured by each photo detector. A position sensitive detector is a photo detector that can measure the position of a light spot in one or two dimensions, normally with a relatively high speed. The position sensitive detector can be configured so that it outputs a first signal that indicates the position on the detector that is irradiated. The position sensitive detector can also be configured to output a second signal that indicates the intensity of the light that irradiates the detector.

In operation, the radiating source 510 outputs a laser beam. In one optional embodiment, the phase of the output laser beam can be adjusted by a half wave plate that is located along the path of the output laser beam. The output laser beam irradiates feed-in mirror 511 and is reflected toward input mirror 512 and then reflected to scan lens 513. Scan lens 513 operates to focus the scanning beam onto the transparent sample. In one example, the scan lens 513 is a telecentric scan lens. Scan lens 513 is configurable such that the scanning beam output from the scan lens 513 irradiates the transparent sample 514 at an angle that is not more than ten (10) degrees from Brewster's angle of the sample 514. Another type of lens which may replace the scan lens is an achromat.

In one example, the sample 514 is opaque. In another example, the sample 514 is semi-transparent. In yet another example, the sample 514 is transparent. For example, the transparent sample 514 may be glass, a thin film deposited on a transparent material, sapphire, fused silica, quartz, silicon carbide, and polycarbonate.

De-scan lens 515 operates to focus the signal from the sample 514 onto output mirror 516. In one example, the de-scan lens 515 a telecentric scan lens that is substantially identical to scan lens 513. De-scan lens 515 can be a telecentric lens or an achromat lens. Utilization of substantially identical lens for scan lens 513 and de-scan lens 515 allows the system to focus on light reflecting from a very thin cross section region of the transparent sample. For example, two telecentric scan lenses may have a field of view greater than one-hundred (100) millimeters. Other examples of a de-scan lens include, but are not limited to: spherical singlet, spherical doublets, triplet, or aspheric lens.

Feed-out mirror 517 operates to reflect the signal from the output mirror 516 to focusing lens 518. Focusing lens 518 has a focal distance based on the focusing lens characteristics. At the focus of the focusing lens 518 there will be two spots (provided the sample is transparent and no defects are present) and these spots correspond to signals from the top and bottom surfaces of the sample. In the event that the sample is not transparent, there will be a single spot from the top surface of the sample. In one example, focusing lens 518 is an achromatic lens with a four-hundred (400) millimeter focal length. Other examples of a focusing lens include but are not limited to: spherical singlet, spherical doublets, triplet, or aspheric lens.

In one example, the light reflected by output mirror 516 irradiates the feed-out mirror at an angle that is not greater than thirty degrees from the normal angle of output mirror 516 (the second time varying beam reflector) when output mirror 516 is positioned at a mid-point of output mirror 516 rotational range.

Non-polarizing beam splitter 519 irradiated by the light focused by focusing lens 518. Upon being irradiated, non-polarizing beam splitter 519 allows a specified portion of the light intensity to pass through to collimating lens 523 and the remaining portion to be reflected to non-polarizing beam splitter 520. The polarization of the transmitted and reflected beams from non-polarizing beam splitter 519 are unchanged. The planes of the non-polarizing beam splitters 519 and 520 can be the same as or perpendicular to the plane of the sample. Upon being irradiated, non-polarized beam splitter 520 allows a specified portion of the light intensity to pass through to detector 521 and reflects the remaining intensity in the other direction to detector 522. The polarization of the transmitted and reflected beams from non-polarizing beam splitter 520 are unchanged. Detector 521 and detector 522 are located approximately one focal length of focusing lens 518 from focusing lens 518.

Figure 33:
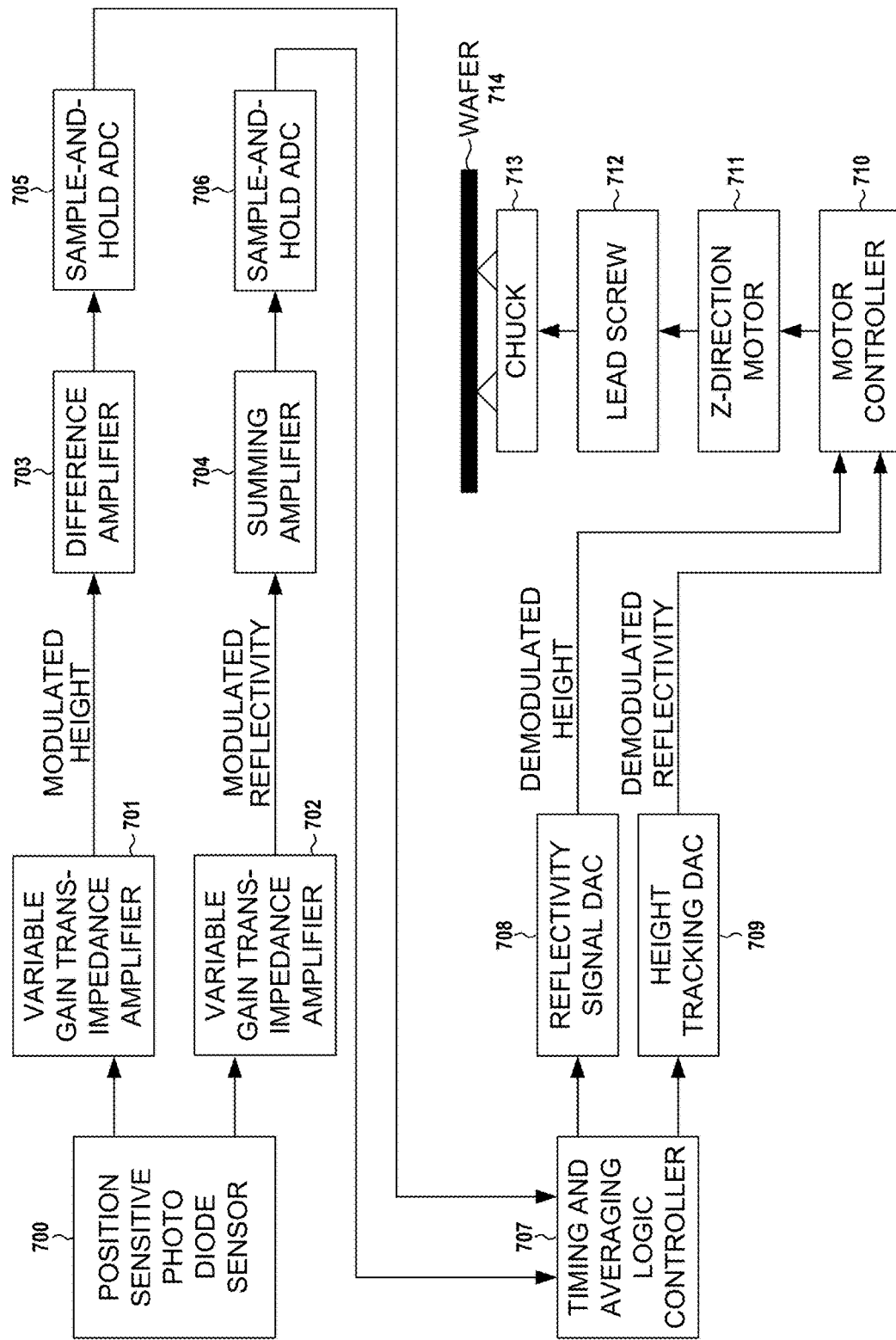
FIG. 33 is a diagram of an electrical system for beam tracking position sensitive detectors.

Detector 521 is configured to track the focus of the light beam. Detector 521 has a low bandwidth of approximately 20 kHz. Detector 521 provides feedback to a sample height control system which maintains the sample at precisely the correct focus. An example of a sample height control system is illustrated in FIG. 33 and described in the accompanying description below.

Detector 522 is a configured to measure the micro-surface profile of the sample. Detector 522 has larger bandwidth of approximately 2 MHz. The output signal from detector 522 is used to measure sub-micron height changes on the sample.

Collimating lens 523 is configured to redirect the focused light beam from focusing lens 518 to a collimated (i.e., parallel) light beam. The collimated light beam irradiates half wave plate 524. Half wave plate 524 rotates the plane of polarization of the collimated light beam. The rotated collimated light beam then irradiates polarizing beam splitter 525. Upon being irradiated, polarizing beam splitter 525 allows all light polarized in one direction to pass through to detector 527 and reflects all light polarized in the other direction to detector 526. The plane of the polarizing beam splitter 525 is the same as the plane of the sample.

Detector 526 is configured to measure the s-component of the polarized light beam. Detector 526 may be a bi-cell, quad-cell, position sensitive detector, PIN diode (single element) or other type of Si based detector.

Detector 527 is a configured to measure the sample surface slope and the p-component of the polarized light beam. Detector 527 may be a bi-cell, quad-cell, position sensitive detector, PIN diode (single element) or other type of Si based detector.

Figure 31:
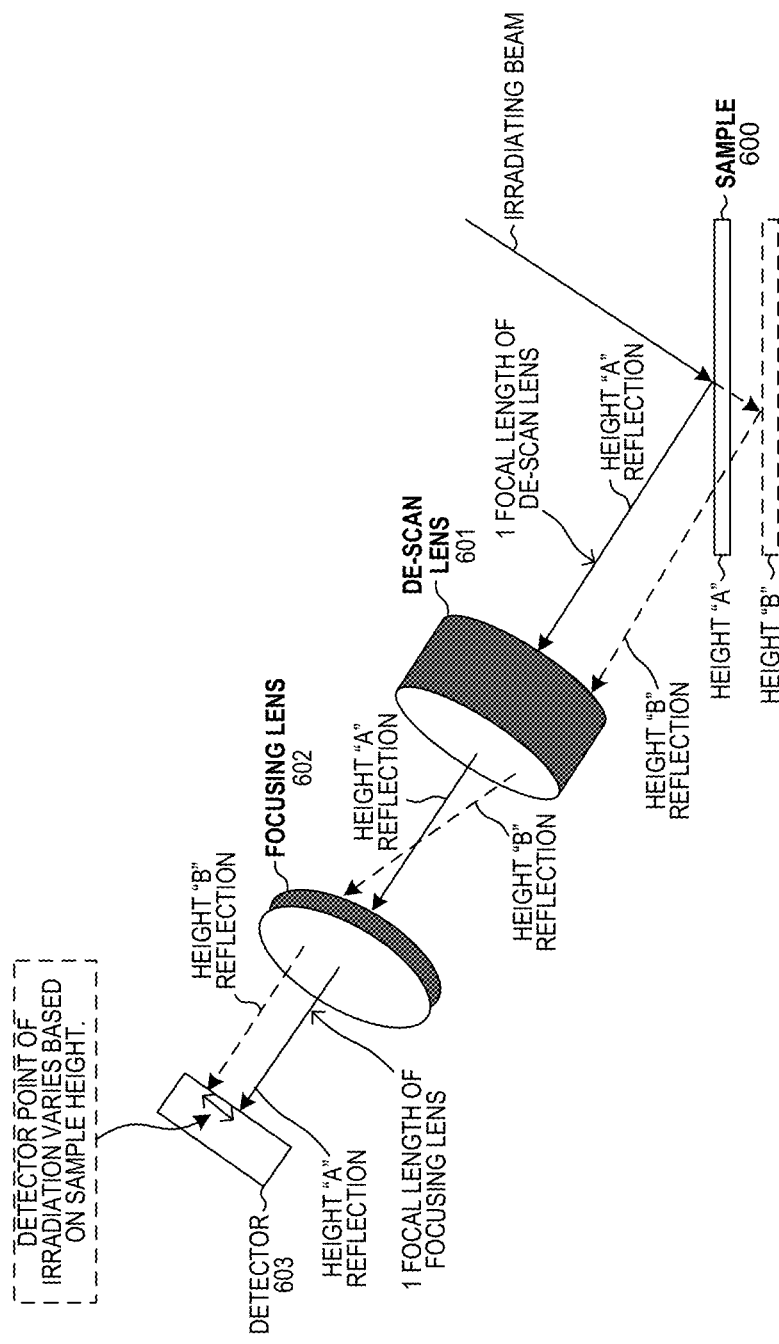
FIG. 31 is a diagram of a simplified example of angle independent surface height optical inspector at different sample heights.

FIG. 31 is a diagram of a simplified example of an angle independent surface height optical inspector at different sample heights. In a first scenario, the sample 600 is located a height "A", it is irradiated with an irradiating beam. The irradiating beam is reflected from the top surface of the sample 600 thereby generating height "A" reflection that irradiates a de-scan lens 601 on center. The de-scan lens 601 is located at one de-scan lens focal length from the irradiation point on the sample 600. The de-scan lens 601 then directs the height "A" reflection to focusing lens 602 on center. Focusing lens 602 then directs the height "A" reflection to a point centered on the detector 603. In a second scenario, the sample is located at a height "B", it is irradiated with an irradiating beam. Given that the height "B" is lower than height "A", a different point on the surface of the sample is irradiated by the stationary irradiating beam. The irradiating beam is reflected from the top surface of the sample 600 thereby generating height "B" reflection that is directed to a position off center on a de-scan lens 601. The de-scan lens 601 is located at one de-scan lens focal length from the irradiation point on the sample 600. The de-scan lens 601 then directs the height "B" reflection to focusing lens 602. Since the height "B" reflection irradiates the de-scan lens 601 off center, the height "B" reflection emitted by de-scan lens 601 is not parallel to the height "A" reflection and irradiates focusing lens 602 off center as well. Focusing lens 602 then directs the height "B" reflection to a point that is not centered on the detector 603. The distance between the point of irradiation of height "A" reflection on the detector and the point of irradiation of height "B" on the detector is proportional to the change in height of the sample between the two measurements.

Figure 32:
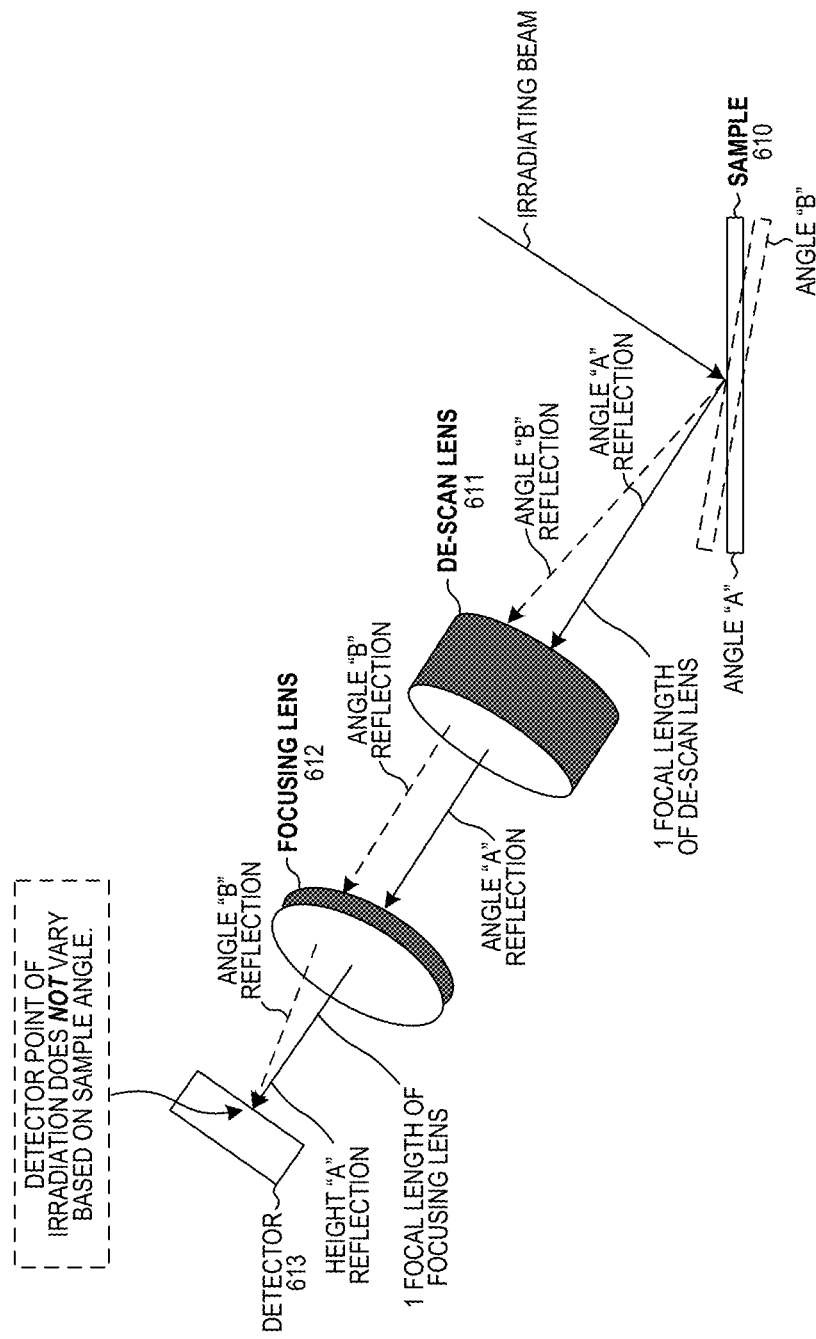
FIG. 32 is a diagram of a simplified example of an angle independent surface height optical inspector at different sample angles.

FIG. 32 is a diagram of a simplified example of an angle independent surface height optical inspector at different sample angles. In a first scenario, the sample 610 is located an angle "A", it is irradiated with an irradiating beam. The irradiating beam is reflected from the top surface of the sample 610 thereby generating angle "A" reflection that irradiates a de-scan lens 611 on center. The de-scan lens 611 is located at one de-scan lens focal length from the irradiation point on the sample 610. The de-scan lens 611 then directs the angle "A" reflection to focusing lens 612 on center. Focusing lens 612 then directs the angle "A" reflection to a point centered on the detector 613. In a second scenario, the sample is located at an angle "B", it is irradiated with an irradiating beam. Given that the angle "B" is different than angle "A", the same point on the surface of the sample is irradiated by the stationary irradiating beam, but the angle of the reflected beam is different. The irradiating beam is reflected from the top surface of the sample 610 thereby generating angle "B" reflection that is directed to a position off center on a de-scan lens 611. The de-scan lens 611 is located at one de-scan lens focal length from the irradiation point on the sample 610. The de-scan lens 611 then directs the angle "B" reflection to focusing lens 612. While the angle "B" reflection irradiates the de-scan lens 611 off center, the angle "B" reflection emitted by de-scan lens 611 is parallel to the angle "A" reflection due to the focusing function of de-scan lens 611. Angle "B" reflection irradiates focusing lens 612 off center as well. Focusing lens 612, by way of providing additional focusing, then directs the angle "B" reflection to a point that is centered on the detector 613. The distance between the point of irradiation of angle "A" reflection on the detector and the point of irradiation of angle "B" on the detector is virtually zero. Therefore, using this optical system it possible to make consistent top surface optical measurements regardless of the angle of the sample being measured by the system. In this sense, the optical system is independent of the angle of the sample being measured.

FIG. 33 is a diagram of an electrical system for beam tracking position sensitive detectors. In normal operation, a sample (or wafer 714) is supported by a chuck 713 and the chuck 713 is on a Z motor (providing up and down motion) 711. The Z motor 711 is part of a feedback loop which receives height information from the beam tracking detector (detector 521 in FIG. 30) and uses this height information to maintain the height of the sample (by moving the Z motor up or down) via lead screw 712. This action means that the focus of the beam from the focusing lens 518 is always maintained at the location of the detector 521 (as well as detector 522). This system is implemented so that there is no focus error at detectors 521 and 522. If the height of the sample was not maintained at a constant position focus position errors at detectors 521 and 522 would be encountered. Detector 521 is not utilized to directly measure the height of the sample, but rather the height of the sample is determined based on the distance that the Z motor has moved to keep focus (i.e., it moves to keep the feedback error signal at a minimum). The bow or warp of the wafer is inversely proportional to the amount that the Z stage has moved. This has the added benefit of keeping the focus of the beam on the sample at a constant size regardless of the sample bow or warp. The micro-profiler channel (detector 522) provides a high frequency channel (several MHz of bandwidth). Given the high physical movement speed required, no mechanical Z motion could ever follow this amount of bandwidth. As a result, detector 521 and the feedback loop maintain the focus on detector 522 and the high frequency signals received from detector 522 are direct measurements of the height of defects or features on the sample (wafer) surface. The height is then normalized by the reflectivity of the sample. In one example, the normalization is performed by dividing the difference between intensity measurements by the sum of intensity measurements. Accordingly, detector 521 is a low frequency position sensitive detection channel (operating in the kHz range) that measures the bow or warp of a wafer by computing it from the movement of the Z motor and at the same time maintains the focus of focusing lens 518 on the detectors 521 and 522 (thereby minimizing focus errors) while detector 522 is a high frequency (in the MHz range) position sensitive detector channel which directly measures the height of defects or features on the wafer surface after normalization is applied.

Figure 34:
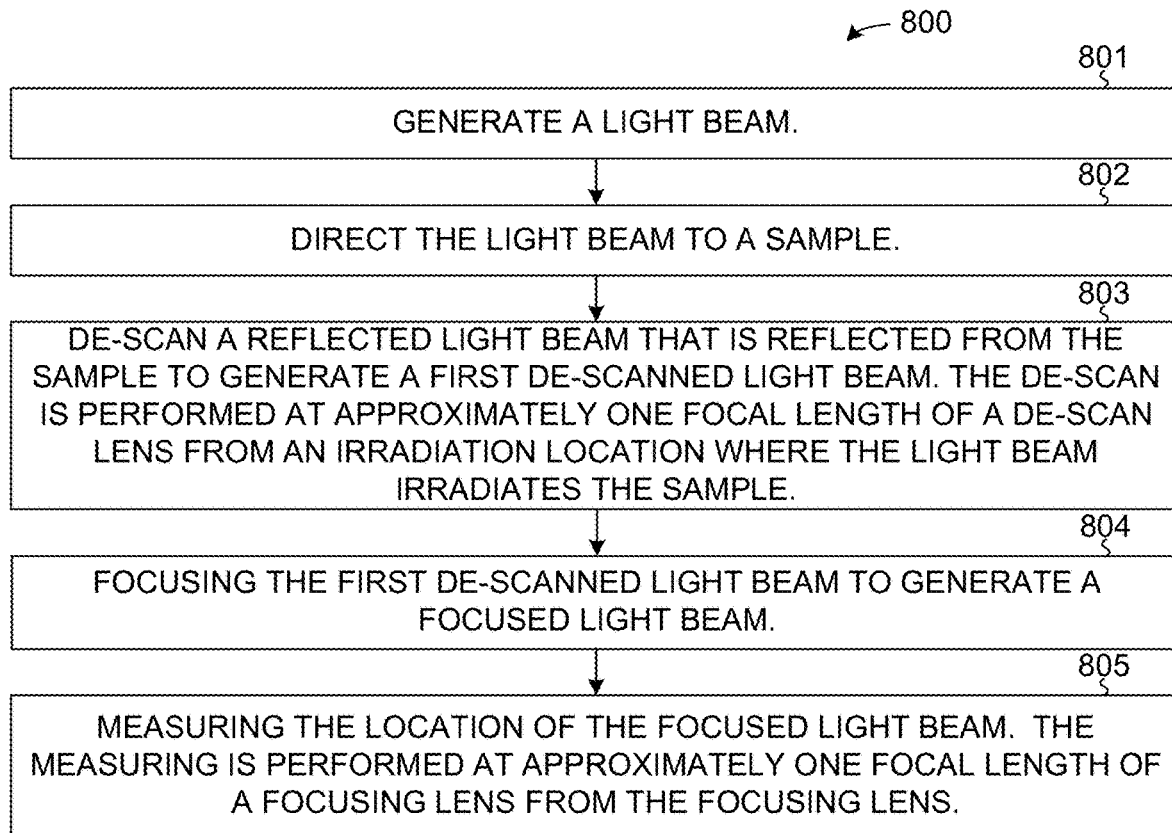
FIG. 34 is a flowchart of an angle independent surface height optical inspector.

FIG. 34 is a flowchart 800 of an angle independent surface height optical inspector. In step 801 a light beam is generated. In step 802 the light beam is directed to a sample. In step 803 a reflected light beam that is reflected from the sample is de-scanned to generate a first de-scanned light beam. The de-scan is performed at approximately one focal length of a de-scan lens from an irradiation location where the light beam irradiates the sample. In step 804 the first de-scanned light beam is focused to generate a focused light beam. In step 805 the location of the focused light beam is measured. The measuring is performed at approximately one focal length of a focusing lens from the focusing lens.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. An optical scanning system, comprising:
a radiating source capable of outputting a source light beam, wherein the optical scanning system is configured to output the source light beam that is directed towards a sample at an incident angle;
a de-scan lens that is configured to output a de-scanned light beam, wherein the de-scanned light beam is created by focusing light reflected from the sample, and wherein the de-scan lens is located approximately one focal length of the de-scan lens from an irradiation location where the light beam irradiates the sample;
a focusing lens that is configured to output a focused light beam, wherein the focused light beam is created by focusing the de-scanned light beam output by the de-scan lens;
a collimating lens that is configured to output a collimated light beam, wherein the collimated light beam is created by collimating the focused light beam output by the focusing lens,
a polarizing beam splitter that is configured to be irradiated by the collimated light beam, and
a first detector that is configured to be irradiated by at least a portion of the collimated light beam that is not reflected by the polarizing beam splitter.

2. The optical scanning system of claim 1, wherein an output of the first detector is used to determine a surface slope of the sample, and wherein the incident angle is within ten degrees of Brewster's angle.

3. The optical scanning system of claim 1, wherein an output of the first detector is used to determine a p-component of the collimated light beam that is not reflected by the polarizing beam splitter.

4. The optical scanning system of claim 1, further comprising a second detector configured to be irradiated by at least a portion of the collimated light beam that is reflected by the polarizing beam splitter.

5. The optical scanning system of claim 4, wherein an output of the second detector is used to determine s-component of the collimated light beam that is reflected by the polarizing beam splitter.

6. The optical scanning system of claim 4, wherein the first detector is a bi-cell detector.

7. The optical scanning system of claim 4, wherein the first detector is a quad-cell detector.

8. The optical scanning system of claim 4, wherein the first detector is a position sensitive detector.

9. The optical scanning system of claim 1, further comprising:
a first time-varying beam reflector configured to direct the source light beam toward the sample; and
a second time-varying beam reflector configured to direct the de-scanned light beam toward the focusing lens.

10. The optical scanning system of claim 9, further comprising:
a scan lens configured to focus the source light beam reflected by the first time-varying beam reflector onto the sample.

11. The optical scanning system of claim 10, wherein the scan lens is a telecentric F-theta lens.

12. The optical scanning system of claim 10, wherein the location of the scan lens is adjustable.

13. The optical scanning system of claim 1, wherein the first detector is a bi-cell detector.

14. The optical scanning system of claim 1, wherein the first detector is a quad-cell detector.

15. The optical scanning system of claim 1, wherein the first detector is a position sensitive detector.

16. The optical scanning system of claim 1, wherein the incident angle is approximately 56.3 degrees.

17. The optical scanning system of claim 1, wherein the focusing lens is an achromat.

18. The optical scanning system of claim 1, further comprising a platform configured to support the sample.

19. The optical scanning system of claim 18, wherein a height of the platform is controllable by a one or more processor circuits.

20. The optical scanning system of claim 1, wherein the location of the de-scan lens is adjustable.

21. The optical scanning system of claim 1, further comprising:
a memory circuit; and
a processor circuit adapted to:
read information received from the first detector; and
determine a surfaces slope of the sample that is irradiated.

* * * * *